US006829753B2

(12) United States Patent
Lee et al.

(10) Patent No.: US 6,829,753 B2
(45) Date of Patent: Dec. 7, 2004

(54) MICROFLUIDIC DESIGN AUTOMATION METHOD AND SYSTEM

(75) Inventors: Michael Lee, Lake Oswego, OR (US); Gajus Worthington, Portola Valley, CA (US); Gregory Harris, Longmont, CO (US); James Montgomery, Longmont, CO (US)

(73) Assignee: Fluidigm Corporation, South San Francisco, CA (US)

( * ) Notice: Subject to any disclaimer, the term of this patent is extended or adjusted under 35 U.S.C. 154(b) by 0 days.

(21) Appl. No.: 09/894,857

(22) Filed: Jun. 27, 2001

(65) Prior Publication Data
US 2002/0108096 A1 Aug. 8, 2002

Related U.S. Application Data
(60) Provisional application No. 60/214,595, filed on Jun. 27, 2000.

(51) Int. Cl.[7] ................................................. G06F 9/45
(52) U.S. Cl. ............................................... 716/5; 716/1
(58) Field of Search ........................... 422/98, 99, 100; 716/1, 5–9, 11, 12, 14, 17

(56) References Cited

U.S. PATENT DOCUMENTS

| | | | |
|---|---|---|---|
| 4,797,842 A | | 1/1989 | Nackman et al. |
| 4,965,743 A | | 10/1990 | Malin et al. |
| 5,487,003 A | | 1/1996 | Iwasawa et al. |
| 5,574,893 A | | 11/1996 | Southgate et al. |
| 5,812,394 A | | 9/1998 | Lewis et al. |
| 5,867,399 A | | 2/1999 | Rostoker et al. |
| 5,867,400 A | * | 2/1999 | El-Ghoroury et al. .......... 716/1 |
| 6,048,498 A | * | 4/2000 | Kennedy ..................... 422/99 |
| 6,056,428 A | | 5/2000 | Devoino et al. |
| 6,149,870 A | * | 11/2000 | Parce et al. ................. 422/100 |
| 6,182,020 B1 | | 1/2001 | Fairbanks |
| 6,235,175 B1 | | 5/2001 | Dubrow et al. |
| 6,274,337 B1 | | 8/2001 | Parce et al. |
| 6,606,735 B1 | * | 8/2003 | Richardson et al. ........... 716/5 |

OTHER PUBLICATIONS

Chou, Hou–Pu, et al., "Microfabricated Devices for Sizing DNA and Sorting Cells," *Micro– and Nanofabricated Structures and Devices for Biomedical Enviornmental Applications*, (1998) vol. 3258:pp 187–7.

Chou, Hou–Pu, et al. "Disposable Microdevices for DNA Analysis and Cell Sorting," *Proc. Solid–State Sensor and Actuator Workshop*, (Jun. 1998) pp:11–14.

Chou, Hou–Pu, et al., "A Microfabricated Device for Sizing and Sorting DNA Molecules," *Proc. Natl. Acad. Sci. USA*, (Jan. 1999) vol. 96:pp 11–13.

Chou, Hou–Pu, et al., "Integrated Elastomer Fluidic Lab–on–a–Chip–Surface Patterning and DNA Diagnostics," *Departments of Electrical Engineering and Applied Physics, Caltech, Pasadena, California 91125, USA*.

Fu, Anne Y., et al., "A Microfabricated Fluorescence–Activated Cell Sorter," *Nature Biotechnology*, (Nov. 1999) vol. 17:pp 1109–1111.

(List continued on next page.)

Primary Examiner—Wilson Lee
(74) Attorney, Agent, or Firm—Townsend and Townsend and Crew LLP; Gregory Lynn Heinkel

(57) ABSTRACT

The present invention generally relates to microfluidics and more particularly to the design of customized microfluidic systems using a microfluidic computer aided design system. In one embodiment of the present invention a microfluidic circuit design method is provided. The method includes developing synthesizable computer code for a design. Next, a microfluidic circuit schematic, including a plurality of symbols for microfluidic components, is generated either interactively or using the synthesizable computer code. The microfluidic circuit schematic is then functionally simulated. The microfluidic components are placed and routed on a template to form a physical layout. Then the physical layout is physically simulated using dynamic simulation models of the microfluidic components; and the physical layout is written to a layout file.

43 Claims, 23 Drawing Sheets

OTHER PUBLICATIONS

Quake, Stephen R., et al., "From Micro– to Nanofabrication with Soft Materials," *Science* (Nov. 2000) vol. 290:pp 1536–1540.

Thorsen, Todd, et al., "Dynamic Pattern Formation in a Vesicle–Generating Microfluidic Device," *Physical Letters Review* (Apr. 2001) vol. 86 No. (18):pp 4163–4166.

Unger, Marc A., et al., "Monolithic Microfabricated valves and Pumps by Multilayer Soft Lithography," *Science* (Apr. 2000) vol. 288:pp 113–116.

Weigl, Bernhard H., "Microfluidics–Based Lab–on–a–Chip Systems," www.devicelink.cm/archive/00/11/008.h.

* cited by examiner

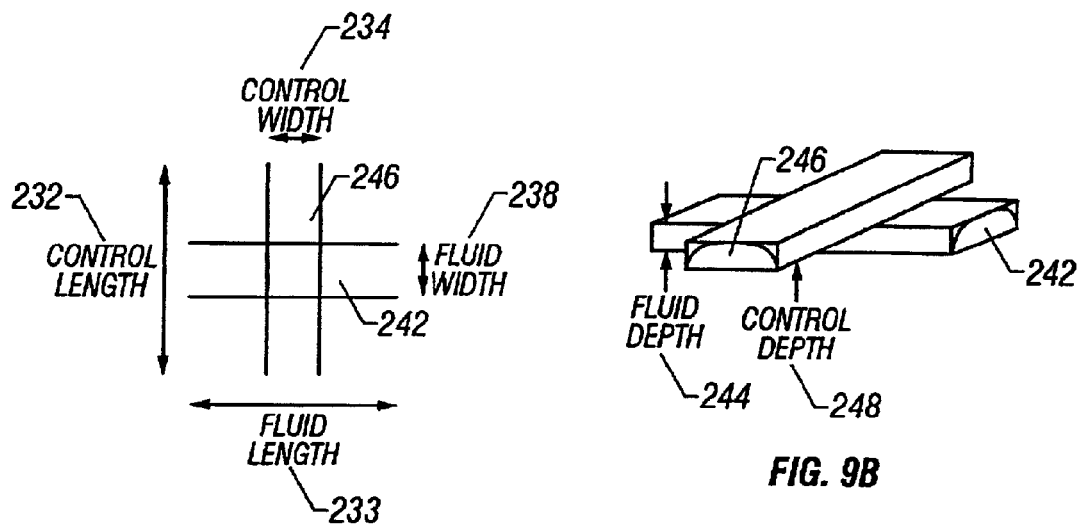
FIG. 9A
FIG. 9B
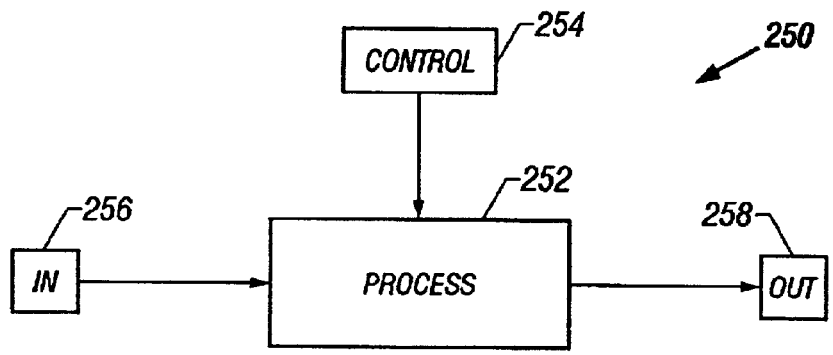
FIG. 10
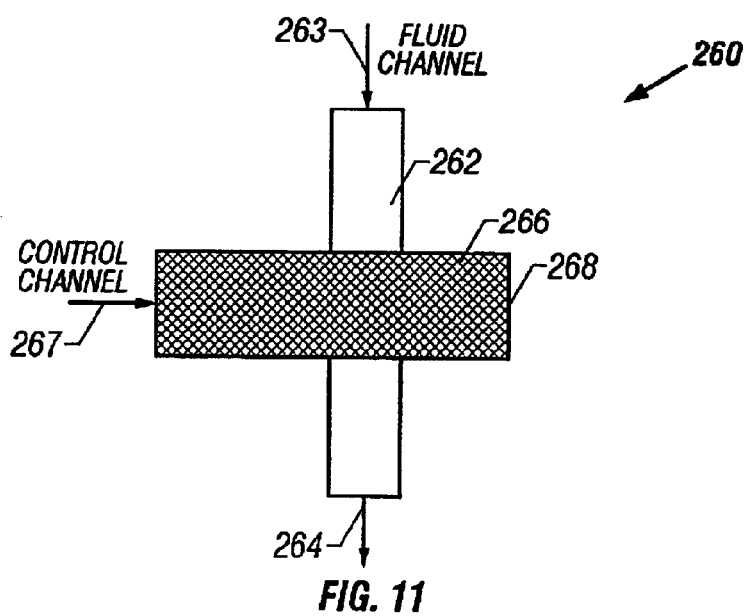
FIG. 11 a b c d e f

MICROFLUIDIC DESIGN AUTOMATION METHOD AND SYSTEM

CROSS-REFERENCES TO RELATED APPLICATIONS

This application claims priority from and incorporates by reference in its entirety U.S. Provisional Patent Application No. 60/214,595, titled "Biological Design Automation System," by Michael Lee, et. al., filed Jun. 27, 2000.

The following concurrently filed, commonly owned, patent applications are incorporated herein by reference in their entirety:

U.S. patent application Ser. No. 09/894,862, entitled "A Computer Aided design Method and System For Developing A Microfluidic System," by Michael Lee, et. al.

U.S. patent application Ser. No. 09/894,858, entitled "An Object Oriented Microfluidic Design Method And System," by Gregory Harris, et. al.

The following references are incorporated herein by reference each in its entirety:

PCT Patent Application No. PCT/US00/17740, entitled "Microfabricated Elastomeric Valve and Pump Systems," filed Jun. 27, 2000 (U.S. patent application Ser. No. 09/605,520);

PCT Patent Application No. PCT/US99/13050, entitled "Microfabricated Sorter for Biological and Chemical Materials" filed May 21, 1999; and U.S. Provisional Patent Application No. 60/282,253, entitled "Microfabricated Fluidic Circuit Elements and Applications," filed Apr. 6, 2001.

BACKGROUND OF THE INVENTION

The present invention generally relates to microfluidics and more particularly to the design of customized microfluidic systems using a microfluidic computer aided design system. Such customized microfluidic systems may be used, for example, for fluid analysis of biological samples.

Typically microfluidic systems for processing fluid samples employ a series of chambers each configured for subjecting the fluid sample to a specific processing step. As the fluid sample flows through the system sequentially from chamber to chamber, the fluid sample undergoes the processing steps according to a specific protocol. Because different protocols require different configurations, the design and manufacturing of such microfluidic systems can be time-consuming and costly.

Conventional computer aided design tools such as AutoCAD® are inadequate for the design and layout of microfluidic systems. For instance, AutoCAD® is a general tool, and has no drawing constraints and provides no specific microfluidic design information associated with a component.

Thus there is a need for computerized design techniques which allow the quick and easy formation of microfluidic systems with different configurations and utilizing different protocols.

SUMMARY OF THE INVENTION

The present invention provides for the design of a microfluidic system, including a microfluidic chip or circuit, using a microfluidic computer aided design (CAD) system. The microfluidic CAD system, henceforth referred to as the "MCAD" system, provides the user with the tools to design, analyze, and implement a customized microfluidic system using a plurality of building block microfluidic components. The MCAD system overcomes the disadvantages of conventional CAD tools by providing, for instance, drawing constraints, design information associated with components, I/O ports, and connectivity to I/O ports, as well as easy layout and manipulation of multilayered components.

In one embodiment the microfluidic system may include a network of single or multi-layer elastomeric structures. In an alternate embodiment some or all the structures may include rigid materials (e.g., silicon-based materials). In yet another embodiment some of the structures may include a mixture of flexible materials, (e.g., elastomeric materials) with the rigid material. Utilization of such an MCAD system can lead to quick and easy implementation of simple to highly complex networks for use in general microfluidic transfer control systems, biological diagnostics systems, etc.

In one embodiment of the present invention a microfluidic device or chip is created from a plurality of microfluidic components according to a design. First a template is selected. Next, the components are placed on the template, manually or automatically, using a placement tool. The components include multilayered components. The components are then routed, manually or automatically, using a routing tool based on preset design rule constraints to achieve a physical layout. Functional analysis (e.g., logical microfluidic flow simulation) and/or physical analysis, (e.g., dynamic microfluidic flow simulation) may then be performed on the physical layout. Following the optional functional analysis and/or physical analysis, the physical layout is used to create the chip layout file, which is later used for fabricating the microfluidic device or chip. In one embodiment of the present invention a microfluidic circuit design method is provided. The method includes developing synthesizable computer code for a design. Next, a microfluidic circuit schematic, including a plurality of symbols for microfluidic components, is generated either interactively or using the synthesizable computer code. A symbol may include at least one control channel and at least one fluid channel. The microfluidic circuit schematic is then functionally simulated. The microfluidic components are placed and routed on a template to form a physical layout. Then the physical layout is physically simulated using dynamic simulation models of the microfluidic components; and the physical layout is written to a layout file.

Another embodiment of the present invention provides a microfluidic circuit design system including one or more of the following: a synthesis module for synthesizing software of a design into a schematic having a plurality of connected symbols of microfluidic components; a design capture module for displaying and manipulating the schematic; a functional analysis module for functionally simulating selected microfluidic components of the schematic; a physical implementation module for placing and routing the microfluidic components into a physical layout according to the design; and a physical analysis module for physically simulating the components in the physical layout.

Another embodiment of the present invention is directed to a method, using a physical layout system, for laying out a microfluidic circuit including a plurality of microfluidic components, where the microfluidic components include multilayered components. The method includes: placing a first component of the plurality of microfluidic components; placing a second component of the plurality of microfluidic components; and connecting the first component to the second component.

In another embodiment of the present invention a method is provided, using a computer system, for physically laying out a microfluidic circuit including a plurality of microfluidic components. The method includes: selecting a template; placing a first microfluidic component with an associated property, such as physical scaling, physical property, layer assignment, equations of motion, simulation data, macro logic functions, or functional definition, on the template; placing a second microfluidic component on the template; and connecting the first component to the second component. The connecting may include a design rule check.

In yet another embodiment of the present invention a microfluidic circuit physical layout method, using a computer, is provided. The method includes: selecting a template including an I/O port; placing a microfluidic component on the template, wherein the microfluidic component has a component control channel and a component fluid channel; and connecting the component control channel to the I/O port.

Another embodiment of the present invention includes a method for physical layout of a microfluidic system using a computer aided design tool. The microfluidic system includes a plurality of microfluidic components. First, a template is selected, including a plurality of layers. Next, a first symbol representing a first component of the plurality of microfluidic components is placed. The first symbol includes a first fluid channel symbol and a first control channel symbol. The first control channel symbol and the first fluid channel symbol are on different layers. Next, a second symbol representing a second component of the plurality of microfluidic components is placed. The second symbol includes a second fluid channel symbol. The first fluid channel symbol is connected or routed to the second fluid channel symbol.

An embodiment of the present invention provides a method for validating a physical layout of a microfluidic circuit design including a plurality of microfluidic components, the method includes placing and routing the plurality of microfluidic components on a template to form the physical layout of the microfluidic circuit design. Next, a dynamic simulation model is determined for each component of the plurality of microfluidic components on the template. Using the physical layout and dynamic simulation models for the plurality of microfluidic components, the physical layout is physically simulated.

An embodiment of the present invention provides a method for device implementation of a microfluidic circuit including a plurality of microfluidic components. The method includes placing and routing the plurality of microfluidic components on a template to form a physical layout of the microfluidic circuit design. Then the physical layout is written to a layout file to be used for manufacturing. Next, a mask is created for a die of a plurality of dies using the layout file, where the die includes the physical layout. The plurality of dies on a wafer are laid out, where the mask creates the die on the wafer.

An advantage of the present invention is the reduction in time needed to complete the design and implementation of a microfluidic circuit. For example, in one embodiment of the present invention, synthesis, schematic capture, and functional simulation allow an efficient and expedient process of creating and validating an initial design, the physical layout tool allows easy placement and routing of multilayered components on a predefined template, the physical simulation allows the reduction in errors before fabrication, and the die placement tool allows faster wafer mask generation.

The uses and results generated by the present invention include cell based assays (including micro cell sorting, genomic analysis, such as DNA sizing, hybridization, sequencing, quantification, and amplification); protein analysis, crystallization and purification; MS-interface; biochemical and electrophysiological assays, gene expressions; differential display analysis; integrated biological sample preparation; single molecule analysis; drug delivery; diagnostics; and other uses and products related to the chemical, biochemical, biological, electronic, computer, appliance, pharmaceutical, medical, or power industries.

These and other embodiments of the present invention are described in more detail in conjunction with the text below and attached figures.

BRIEF DESCRIPTION OF THE DRAWINGS

FIGS. 9a and 9b show simplified top plan view and perspective view of an on-off valve component of an embodiment of the present invention;

FIG. 10 shows an IDEF0 diagram representing a microfluidic component of an embodiment of the present invention;

FIG. 11 shows a microfluidic valve symbol of an embodiment of the present invention;

DESCRIPTION OF THE SPECIFIC EMBODIMENTS

Figure 1:
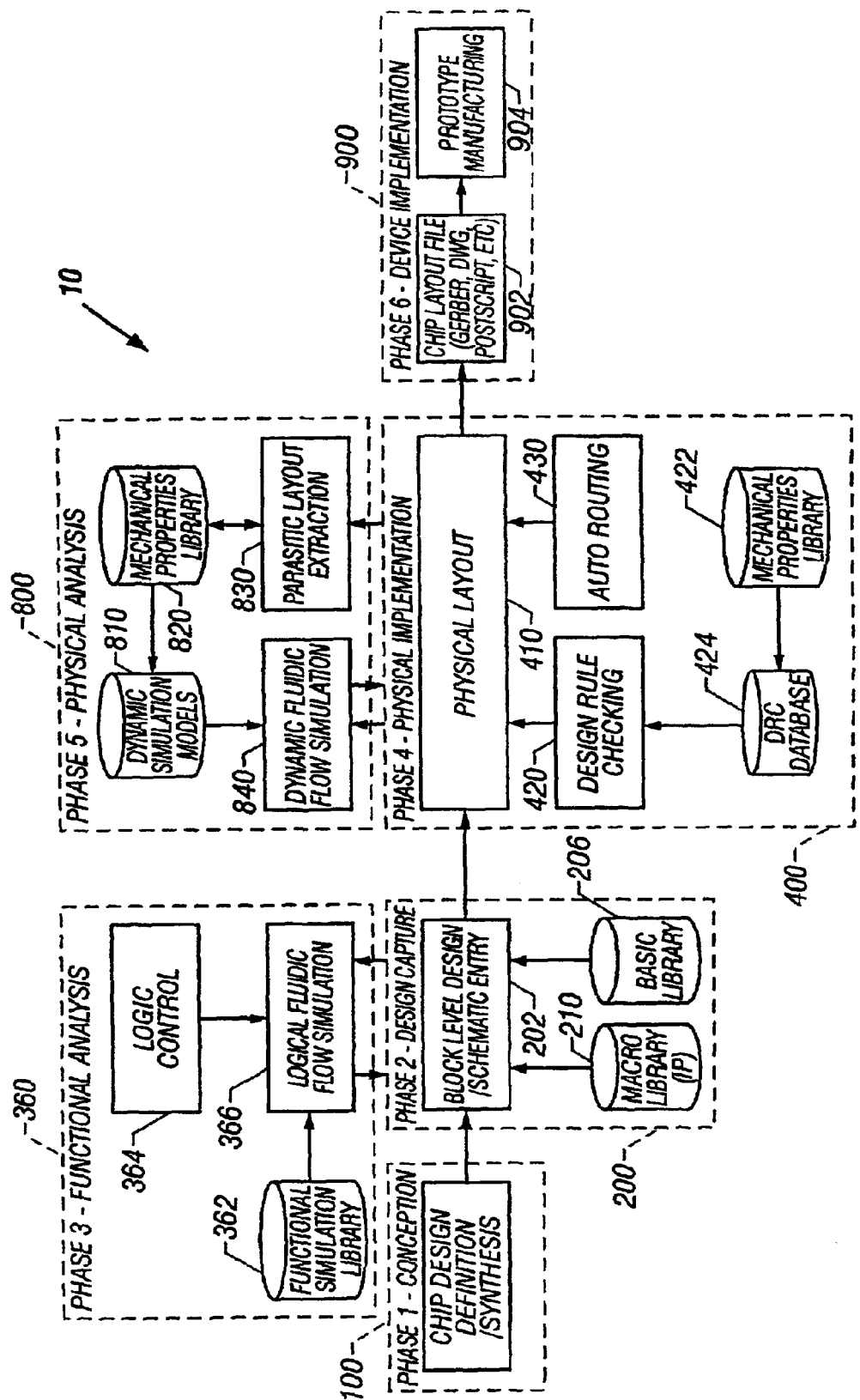
FIG. 1 shows a simplified block diagram of the MCAD system of an embodiment of the present invention.

Embodiments of the present invention are directed to the design of customized microfluidic systems using a microfluidic computer aided design (MCAD) system. The MCAD system provides the user with the tools to design, analyze, and implement a customized microfluidic system using a plurality of building block microfluidic components.

In one embodiment of the invention, the MCAD system includes a design capture module including a schematic entry tool for selecting and connecting microfluidic components according to a design. The system further includes a functional analysis module for functionally simulating selected microfluidic components of the design, a physical implementation module for arranging the microfluidic components into a physical layout according to the design, and a physical analysis module for physically simulating the microfluidic components in the physical layout.

In some embodiments, the modules comprise computer instructions or code stored in a computer-readable medium. The computer-readable medium is operatively coupled to a network (e.g., an internal computer bus, an external Local Area Network (LAN), or the Internet) to permit access to the instructions via the network.

The microfluidic components may be selected from a library or libraries having, for example, channels, pumps, valves, chambers, and layer interconnects (or vias). The library or libraries include normalized, custom, pre-defined, and/or user-defined, microfluidic components. The microfluidic components are connected according to preset design rules. The microfluidic components may be assigned physical scaling and physical properties. The selected components are typically active fluidic components.

The microfluidic components may include conventional microfluidic structures composed of hard, inflexible materials (such as silicon) or microfluidic structures made out of various layers of elastomer bonded together. An embodiment of the present invention uses a multi-layer soft lithography process to build integrated (i.e., monolithic) microfabricated elastomeric structures. Advantages of fabricating the elastomeric structures by binding together layers of soft elastomeric materials include the fact that the resulting devices are reduced by more than two orders of magnitude in size as compared to silicon-based devices. Further advantages of rapid prototyping, ease of fabrication, and biocompatability are also achieved. Further details may be found in PCT Patent Application No. PCT/US00/17740, entitled "Microfabricated Elastomeric Valve And Pump Systems," filed Jun. 27, 2000; Hou-Pu Chou et al., "Integrated Elastomer Fluidic Lab-on-a-chip—Surface Patterning and DNA Diagnostics," Proceedings of the Solid State Actuator and Sensor Workshop, Hilton Head, S.C. (2000); Stephen R. Quake and Axel Scherer, "From Micro- to Nanofabrication with Soft Materials," Science 290: 1536–40 (2000); and M. A. Unger et al., "Monolithic Microfabricated Valves and Pumps by Multilayer Soft Lithography," Science 288: 113–116 (2000). These are incorporated herein by reference each in its entirety.

The selected microfabricated components of the design may be functionally simulated by applying control stimuli to the control channels of selected active fluidic components to show functional connectivity of the design. In one embodiment of the functional simulation, components of the design are represented by Boolean expressions with operands based on connection ports of the control channels of the active fluidic components. Actuation of the active fluidic components is simulated using control stimulus generated by a Boolean based language with timing constraints. The design may be modified based on results of the functional simulation.

The microfluidic components in the physical layout may be physically analyzed. The physical analysis may include, for instance, analyzing dynamic volumetric flow rates in the components, analyzing component volumes, and analyzing volumetric capacitances of interconnecting and routing channels in the physical layout. Physically simulating the components of the physical layout may include simulating actuation of dynamic fluid flow in the components using control stimulus generated by a Boolean based language. The physical layout may be modified based on results of the physical simulation. The physical layout may be written to a layout file to be used for manufacturing.

For the purposes of this application a channel, for example, a control channel or a fluid/fluidic channel, may contain either a gas or a liquid. In one embodiment the control layer has pressurized air and the fluid layer has a liquid substance. Other embodiments have other combinations of gas-gas, liquid-gas, or liquid-liquid in two or more channels.

FIG. 1 shows a simplified block diagram of the MCAD system 10 of an embodiment of the present invention. There are four primary phases (phases 1, 2, 4, and 6) and two secondary phases (phases 3 and 5). Design conception 100 is the first step (phase 1) where the desired functionality of the microfluidic circuit is determined. Once the functionality has been determined, the second primary step 200 (phase 2) is to capture the resulting circuit schematically using basic predefined components 206, macro components 210, or user-defined components. The components may be microfluidic multilayered structures with at least one control channel and at least one fluid channel, where the control channel controls the fluid (liquid or gas) flow through the fluid channel. These channels may contain either a liquid or a gaseous substance. The third primary step 400 (phase 4) is the physical implementation of the design and involves the physical layout (i.e., placing and routing the components making up the circuit) either manually or automatically, from a two and/or three dimensional perspective. The fourth, and final, primary step 900 (phase 6) is the actual creation of the microfluidic chip. The two optional secondary phases 360 and 800 are shown as well and are used at different points of the MCAD system 10. These secondary phases involve, respectively, the functional analysis and physical analysis of the described design and layout. Functional analysis 360 (phase 3) aides the designer in verifying the desired function or behavior of the design. Examples of functional analysis are connectivity analysis to determine if the components are connected together or control channel analysis to determine that the proper control channels are activated in the right sequence. Physical analysis 800 (phase 5) allows the designer to verify and analyze the dynamic performance of the design. While functional and physical analyses are not critical for simple low component count design, they become important for moderately complex to highly complex designs by minimizing the need to empirically test and redesign until the desired network is achieved.

Conception (Phase 1)

The microfluidic circuit or chip design begins with the conception 100 of the desired functionality, outputs, or results to be achieved by inputting fluids into the microfluidic circuit or chip (phase 1).

One specific embodiment employs a black box analysis in which the inputs and outputs are first determined. A computer program using a synthesis language may then be written to simulate the generation of the outputs from the inputs. The synthesis language can be run through a synthesis compiler to generate a microfluidic circuit having a plurality of interconnected microfluidic components or structures. The synthesis compiler may also optimize a part of or all of the microfluidic circuit according to some criteria, such as minimum area. In such an embodiment, the design capture (phase 2) in effect is automatically done by the synthesis tool with access to the macro library 210 and basic library 206.

A fluidic synthesis language is like a synthesis language in the electrical arts in that certain programming language constructs map to certain structures or combinations of structures. For example, in electronic circuit design, a Hardware Description Language (HDL), such as VHSIC HDL (VHDL) or Verilog, is used to simulate the behavior of a circuit design at an abstract level (e.g., at the Register Transfer Language (RTL) level). Then, the VHDL or Verilog code is used by a synthesis tool (e.g., a tool available from Synopsys Inc. of Mountain View, Calif.) to produce an optimized gate level description of the circuit. As a simple illustration the operators in Boolean logic, such as "not," "and," or "or," map to an inverter, AND gate, and OR gate. Thus a Boolean expression may be mapped (and optimized) to a respective set of hardware logic gates. In a more complicated example a "case statement" in VHDL may be synthesized into a gate level implementation of a Finite State Machine (FSM).

In an embodiment of the present invention various microfluidic structures or components represent various digital and analog functions. Examples are given in U.S. Provisional Patent Application No. 60/282,253, entitled "Microfabricated Fluidic Circuit Elements and Applications," filed Apr. 6, 2001, which is incorporated herein by reference in its entirety. Some of the microfluidic structures or components disclosed may be configured to imitate the functionality of semiconductor circuits, such as ON/OFF switches, resistors, capacitors, logic gates, latches, switching regulators, and devices that perform mathematical functions. The microfabricated fluidic logic gates include AND gates, OR gates, NOR gates, NAND gates, inverters, and numerous other Boolean and logic functions. In addition the microfluidic components may also perform analog functions such as amplification or regulation. For example, analog components include switching regulators, capacitors, pressure multipliers, and pressure sources.

Figure 2A:
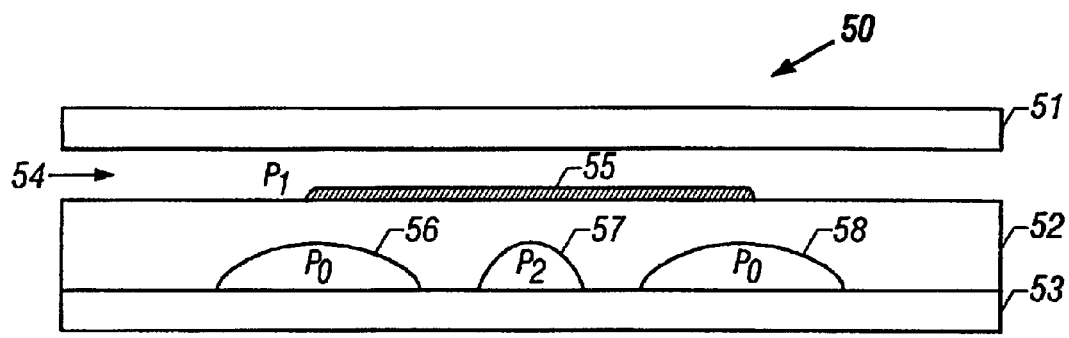
FIG. 2A is a simplified cross-sectional view of microfluidic switch along channel of an embodiment of the present invention.
Figure 2B:
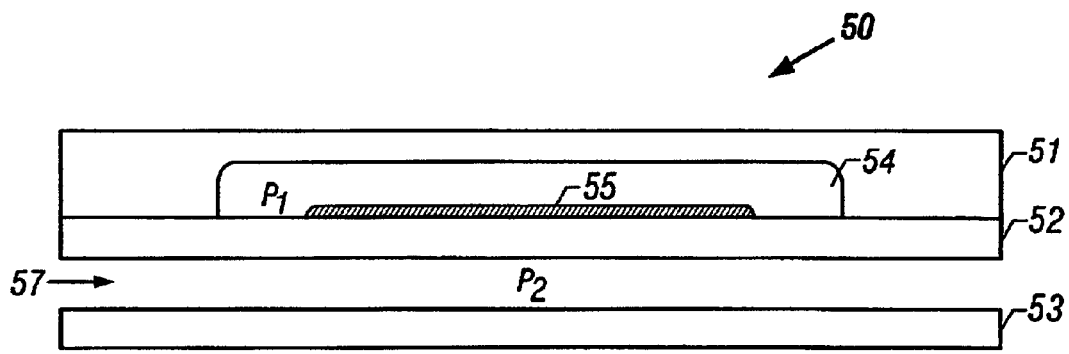
FIG. 2B is a simplified cross-sectional view of microfluidic switch along channel of an embodiment of the present invention.
Figure 3:
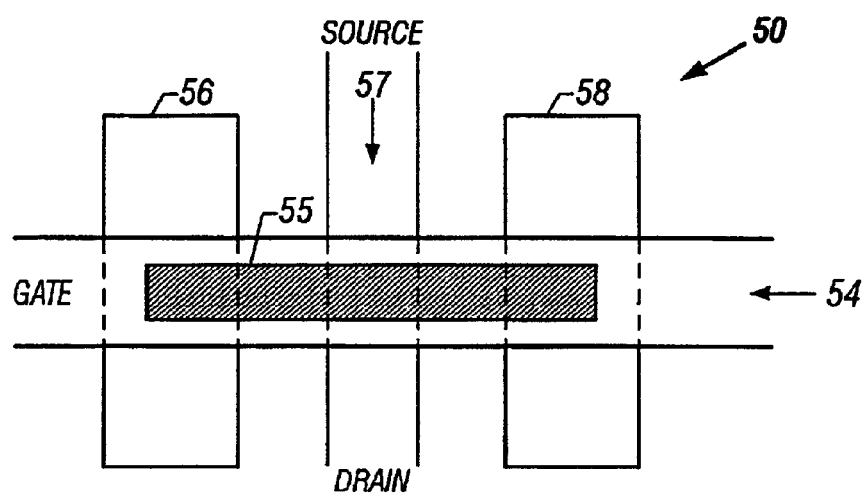
FIG. 3 is a simplified top down view of microfluidic switch of an embodiment of the present invention
Figure 5A:
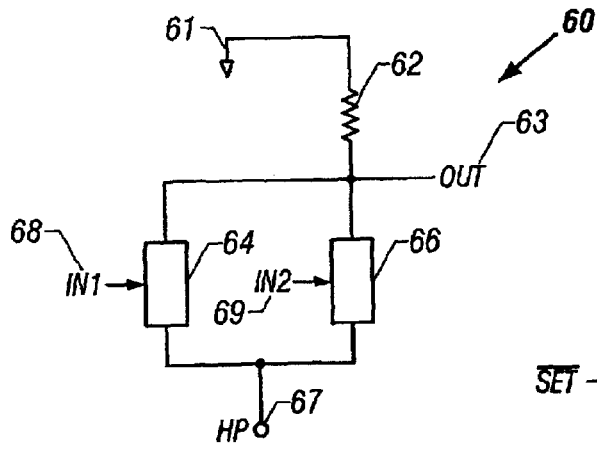
FIGS. 5A and 5B show an example of a microfluidic NAND gate of an embodiment of the present invention.
Figure 6A:
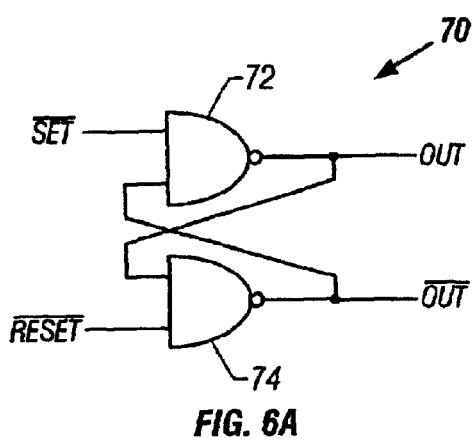
FIGS. 6A ands 6B show an example of a microfluidic S-R latch of an embodiment of the present invention.
Figure 5B:
Figure 6B:
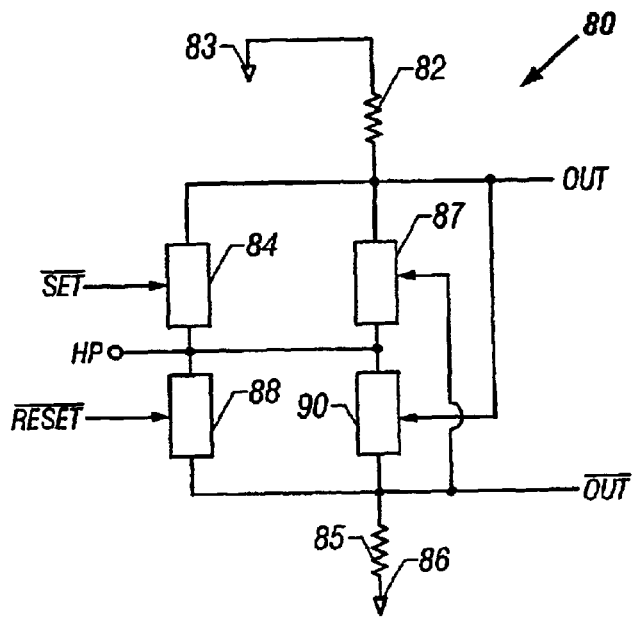

Microfluidic logic gates may perform the same Boolean logic function as electronic gates, but are substantially different both structurally and in the way they perform the logic function. As an illustration, FIGS. 2A, 2B, and 3 show the structure of a microfluidic ON/OFF switch. Symbols representing microfluidic devices are shown in FIGS. 4A–4K. FIG. 5A shows an example of a NAND gate. FIG. 6B shows an example of an S-R latch. FIGS. 5B and 6A show the symbols for the NAND gate and S-R latch.

A microfluidic ON/OFF switch is "open" during its ON state allowing fluid (liquid or gas) flow through the channel between the source and the drain. A fluidic switch is "closed" during its OFF state preventing fluid (liquid or gas) flow through the channel between the source and the drain. Microfluidic switches are opened and closed by changing the pressure in the gate of the switch either by liquid or gas pressure. The pressure in the gate of the switch does not need to be increased above or reduced below the pressure in the drain-to-source channel. This provides an advantage over prior art, because microfluidic switches of this embodiment of the present invention can be coupled together to control each other on a single chip to perform complex logic, mathematical, multiplexing, and latching functions.

An embodiment of a microfluidic switch is shown in FIGS. 2A–2B and 3. FIG. 2A is a cross-sectional view of microfluidic switch 50 along channel 54; FIG. 2B is a cross-sectional view of microfluidic switch 50 along channel 57; and FIG. 3 is a top plan view of microfluidic switch 50. Microfluidic switch 50 includes substrate 53, elastomeric layer 52, and elastomeric layer 51 as shown in FIG. 2A. As seen in FIG. 3, elastomeric layer 51 contains channel 54, and elastomeric layer 52 contains channel 57 and chambers 56 and 58. Channel 54 is coupled to the gate of the switch 50. Channel 57 is coupled between the source and the drain of the switch 50. Layers 51-53 may be formed and hermetically sealed using methods described in further detail in PCT Patent Application No. PCT/US00/17740, entitled "Microfabricated Elastomeric Valve and Pump Systems," filed Jun. 27, 2000, which designates the United States and is incorporated herein by reference in its entirety.

Layer 55 comprises a rigid material that is deposited on top of layer 52. Layer 51 may then be placed on top of layer 52 so that layer 55 is inside channel 54. Layer 55 is deposited on layer 52 so that it overlaps channel 57 and portions of chambers 56 and 58 as shown in FIG. 3. A fluid is passed through channel 54 at pressure P1. A fluid is passed through channel 57 at pressure P2. Channel 54 is perpendicular to channel 57. Chambers 56 and 58 contain fluid at ambient pressure P0.

When the pressure P1 in channel 54 is increased above P0, the radius of channel 54 expands and rigid layer 55 moves downwardly (with respect to FIGS. 2A–2B) applying pressure against channel 57 and chambers 56 and 58. As PI increases, layer 55 presses down on the portion of channel 57 beneath layer 55 pinching channel 57 closed. Channel 57 is concave in shape making it more collapsible so that channel 57 makes a complete seal to completely block the flow of fluid therethrough when P1 is increased to a predetermined level.

The microfabricated fluidic structure of FIGS. 2A–2B and FIG. 3 functions as a switch that causes channel 57 to be opened or closed. When pressure P1 equals P0, channel 57 is open and fluid can flow therethrough. When pressure PI is increased to a predetermined level in channel 54, channel 57 closes and the flow of fluid through channel 57 is blocked. Therefore, a fluidic switch is open when fluid is allowed to flow through a specific channel and closed when the flow of fluid through that channel is blocked.

Chambers 56 and 58 reduce the upward force that elastomer material in layer 52 applies to layer 55 when channel 54 expands so that channel 57 closes more quickly and completely. When channel 54 expands to close channel 57, fluid is displaced from the area of chambers 56 and 58 directly beneath channel 54 into adjacent portions of chambers 56 and 58. Chambers 56 and 58 allow channel 57 to be closed without having to increase the pressure in gate channel 54 above the pressure in channel 57. Therefore, switch 50 may be coupled with other microfluidic switches to perform logic functions and other functions, because switch 50 does not require a pressure drop from the gate channel 54 to the source-to-drain channel 57.

Figure 4A:
FIGS. 4A–4K show symbols representing microfluidic devices of an embodiment of the present invention.
Figure 4B:
Figure 4C:
Figure 4D:
Figure 4E:
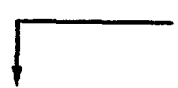
Figure 4F:
Figure 4G:
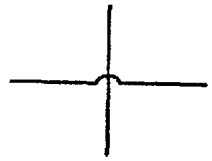

For illustrative purposes symbols representing a number of microfluidic devices are shown in FIGS. 4A–4K. The symbol of FIG. 4A represents a low flow resistance channel. The symbol of FIG. 4B represents a high flow resistance channel such as a long or a constricted channel. A fluidic resistor acts similarly to an electrical resistor. A fluidic resistor exists when there is a high pressure difference between two terminals and a low flow between them. The symbol of FIG. 4C represents a channel terminal. The symbol of FIG. 4D represents a high pressure source. The symbol of FIG. 4E represents an ambient exhaust terminal. The symbol of FIG. 4F represents a node where channels connect. The symbol of FIG. 4G represents two channels that cross but do not connect.

Figure 4H:
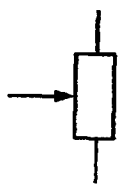
Figure 4I:
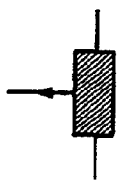
Figure 4J:
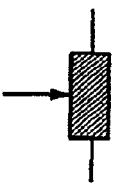
Figure 4K:
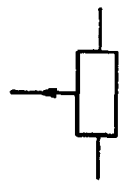

The symbol of FIG. 4H represents a pressure-actuated, normally open switch in which the pressure in the gate chamber is increased above ambient pressure to a high pressure in order to close the switch. The symbol of FIG. 4I represents a vacuum-actuated normally closed switch in which the pressure in the gate chamber is reduced from ambient pressure to a vacuum to open the switch. The symbol of FIG. 4J represents a pressure-actuated normally closed switch in which the pressure in the gate chamber is increased from ambient pressure to a high pressure to open the switch. The symbol of FIG. 4K represents a vacuum-actuated normally open switch in which the pressure in the gate chamber is reduced from ambient pressure to a vacuum to close the switch.

Some of the microfluidic devices of the present invention may be connected together to form logic gates that perform logic functions and Boolean algebra. Previously known microfluidic chips often perform logic functions off-chip using electrical circuitry and then route the output signal onto the microfluidic chip through macroscopic control lines which are cumbersome and take up a lot of space. Performing logic functions on chip using microfluidic logic gates can greatly reduce the number control lines routed onto the chip which advantageously saves space.

The bistable logic levels for the microfluidic logic gates are high pressure (HIGH) and low pressure (LOW). Each logic gate has a connection to a low pressure source (e.g., ambient pressure), and a connection to a high pressure source (e.g., higher than ambient pressure). In an alternate embodiment, each logic gate has a connection to ambient pressure and a connection to a vacuum. In this embodiment, LOW refers to the vacuum and HIGH refers to ambient pressure.

All Boolean functions can be constructed entirely from NAND gates or entirely from NOR gates. A NAND gate performs an AND function on a set of inputs and inverts the output. A NOR gate performs an OR function on a set of inputs and inverts the output.

An example of a NAND logic gate formed with microfabricated fluidic switches is shown in FIG. 5A. NAND gate 60 includes microfluidic resistor 62 which is coupled between an ambient exhaust terminal 61 and output terminal OUT 63. NAND gate 60 also includes pressure-actuated normally open microfluidic switches 64 and 66 which are coupled in parallel between OUT 63 and high pressure terminal HP 67. The gate of switch 64 is coupled to input terminal IN1 68, and the gate of switch 66 is coupled to input terminal IN2 69.

When either of inputs IN1 68 and IN2 69 is at ambient pressure (LOW), one of switches 64 or 66 is open, and fluid flows from the HP terminal 67 to the ambient exhaust 61 through the open switch(es) and resistor 62. The pressure at OUT 63 increases to high pressure (HIGH), because the resistance of resistor 62 is greater than the resistance of switches 64 and 66. When both inputs IN1 68 and IN2 69 are at high pressure (HIGH), both of switches 64 and 66 are closed and fluid flow to the HP terminal 67 is blocked. The pressure at OUT 63 diffuses through resistor 62 to the ambient exhaust terminal 61 causing the pressure at OUT 63 to decrease to ambient pressure (LOW).

A microfluidic NAND gate may comprise any number of input terminals greater than one. Each input terminal is coupled to the gate of a normally open switch coupled in parallel with switches 64 and 66 between OUT and the HP terminal. Of course, other configurations for the construction of NAND logic gates known to those of skill in the semiconductor circuit design art may be used to design a microfluidic NAND gate in which transistors are replaced with microfluidic switches. The symbol for a two input NAND gate is shown in FIG. 5B. The truth table for a two input NAND gate is shown in Table 1 below (wherein H denotes high pressure and L denotes low pressure):

TABLE 1

| IN1 | IN2 | OUT |
|-----|-----|-----|
| H | H | L |
| H | L | H |
| L | H | H |
| L | L | H |

A microfluidic structure may also be used to construct Set-Reset (S-R) latches that have the same truth table as S-R latches constructed from electronic circuits. Latch 70 in FIG. 6A is one example of an S-R latch that is constructed with two cross-coupled NAND gates 72 and 74. NAND gate 72 has a first input terminal $\overline{SET}$ and a second input terminal coupled to the output terminal $\overline{OUT}$ of NAND gate 74. NAND 74 has a first input terminal $\overline{RESET}$ and a second input terminal coupled to the output terminal OUT of NAND gate 72.

Latch 70 operates as follows. A transitory LOW signal occurs when the $\overline{\text{SET}}$ or $\overline{\text{RESET}}$ input transitions from high pressure (HIGH) to ambient pressure (LOW) and then transitions back to high pressure (HIGH) again. When a transitory LOW occurs on the $\overline{\text{SET}}$ input, OUT goes HIGH and remains HIGH. When a transitory LOW signal occurs on the $\overline{\text{RESET}}$ input, $\overline{\text{OUT}}$ goes HIGH and remains HIGH. When the pressure at the $\overline{\text{SET}}$ and $\overline{\text{RESET}}$ inputs are both HIGH, outputs OUT and $\overline{\text{OUT}}$ remain in their previous states. An unstable condition exists at outputs OUT and $\overline{\text{OUT}}$ when the pressure at the $\overline{\text{SET}}$ and $\overline{\text{RESET}}$ inputs are both LOW.

An example of an S-R latch constructed with microfluidic cross-coupled NAND gates is shown in FIG. 6B. Latch 80 includes fluidic resistor 82 which is coupled between a first ambient exhaust terminal 83 and output terminal OUT, and fluidic resistor 85 which is coupled between a second ambient exhaust terminal 86 and output terminal $\overline{\text{OUT}}$. Latch 80 also includes pressure-actuated normally open microfluidic switches 84 and 87 that are coupled in parallel between OUT and a high pressure terminal HP, and pressure-actuated normally open microfluidic switches 88 and 90 that are coupled in parallel between $\overline{\text{OUT}}$ and the HP terminal. The gate of switch 84 is coupled to input terminal $\overline{\text{SET}}$, the gate of switch 87 is coupled to the output terminal $\overline{\text{OUT}}$, the gate of switch 88 is coupled to input terminal $\overline{\text{RESET}}$, and the gate of switch 90 is coupled to output terminal OUT.

When the pressure at the $\overline{\text{RESET}}$ input remains HIGH and the pressure at the $\overline{\text{SET}}$ input transitions from HIGH to LOW, switch 88 is closed, switch 84 opens, and the pressure at OUT goes HIGH because it is coupled to the high pressure terminal HP through low resistance switch 84. Switch 90 is closed because OUT is HIGH, and the pressure at $\overline{\text{OUT}}$ goes LOW, because $\overline{\text{OUT}}$ is decoupled from the HP terminal. Switch 87 is open, because $\overline{\text{OUT}}$ is LOW. When the pressure at the $\overline{\text{SET}}$ input goes HIGH again, switch 84 closes. However, the pressure at OUT remains HIGH, because OUT is coupled to the HP terminal through switch 87 which remains open. The pressure at $\overline{\text{OUT}}$ remains LOW, because switch 90 remains closed.

When the pressure at the $\overline{\text{SET}}$ input remains HIGH and the pressure at the $\overline{\text{RESET}}$ input transitions from HIGH to LOW, switch 84 remains closed and switch 88 opens. The pressure at $\overline{\text{OUT}}$ goes HIGH, because $\overline{\text{OUT}}$ is coupled to the HP terminal through low resistance switch 84. Switch 87 is closed because $\overline{\text{OUT}}$ is HIGH, and the pressure at OUT goes LOW, because it is decoupled from the HP terminal. When the pressure at the $\overline{\text{RESET}}$ input goes HIGH again, switch 84 closes, but switch 90 remains open because OUT is LOW. Therefore, the pressure $\overline{\text{OUT}}$ remains HIGH keeping switch 87 closed, so that the pressure at OUT remains LOW.

When the pressures at $\overline{\text{RESET}}$ and $\overline{\text{SET}}$ are both HIGH, the pressures at OUT and $\overline{\text{OUT}}$ both remain at their previous logic states. The pressures at OUT and $\overline{\text{OUT}}$ are both HIGH when the pressures at $\overline{\text{RESET}}$ and $\overline{\text{SET}}$ are both LOW, which is considered an unstable output state because OUT and $\overline{\text{OUT}}$ cannot remain in that state when $\overline{\text{RESET}}$ or $\overline{\text{SET}}$ go HIGH. The truth table for latch 80 is shown in Table 2.

TABLE 2

| $\overline{\text{SET}}$ | $\overline{\text{RESET}}$ | OUT | $\overline{\text{OUT}}$ |
|---|---|---|---|
| H to L to H | H | H | L |
| H | H to L to H | L | H |
| H | H | Previous State | Previous State |
| L | L | H | H |

Microfluidic S-R latches can be used to provide a large number of arbitrary latched control signals from a small number of control lines that are multiplexed externally. Thus, having fluidic devices that perform the function of S-R latches on the fluidic chip also greatly reduces the number of control lines that need to be brought onto the chip from external sources, providing additional space saving.

In one embodiment of a microfluidic circuit, when it is desirable to perform logic functions on chip using microfluidic logic gates rather than conventionally using electrical circuitry and then routing the output signal onto the microfluidic chip through macroscopic control lines, the Boolean equations, which may include timing, are first determined. These Boolean equations can be simulated to test functionality (phase 3) and then can be used, either manually or automatically, to generate the circuit.

A Hardware Description Language (HDL) may be used to model both the control channels and the fluid channels of a microfluidic circuit. In one embodiment a digital HDL, such as VHDL or Verilog, is used to model (and/or synthesize) the control channels, which perform the logical control functions of the microfluidic circuit. An analog HDL such as Verilog-A or VHDL-AMS may be used to model (and/or synthesize) the fluid channels of the microfluidic circuit. Since VHDL-AMS can model mixed digital-analog designs, VHDL-AMS may be used to model (and/or synthesize) both the digital control functions of the control channels as well as the analog fluid flow of the fluid channels. Since a component includes at least one control channel and at least one fluid channel in this embodiment, VHDL-AMS can model (and/or synthesize) the control function of the control channel, for example, ON/OFF, the fluid flow through the fluid channel, and the interaction between the control channel and the fluid channel for the component.

In an embodiment VHDL or Verilog code is written which allows the testing of the control logic via simulation using a commercial VHDL or Verilog tool. Next the control logic is synthesized and optimized using a commercial VHDL or Verilog synthesis tool, but using microfluidic logic gates rather than digital logic gates.

An illustrative simple example is the synthesis of a microfluidic D-latch using VHDL, a microfluidic S-R latch (FIG. 6A) and microfluidic NAND gates (FIG. 5B). A D-latch has the following truth table (Table 3):

TABLE 3

| D | En | Q |
|---|---|---|
| H | H | H |
| L | H | L |
| H | L | Previous State |
| L | L | Previous State |

Figure 7A:
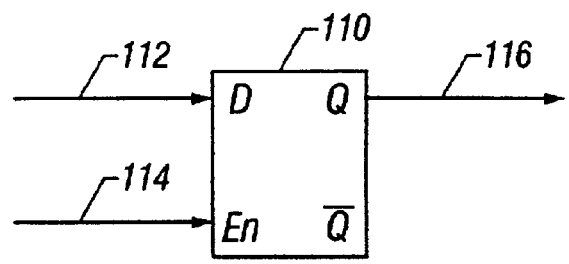
FIG. 7A shows a symbol for a D-latch of an embodiment of the present invention.

FIG. 7A shows a symbol for a D-latch 110. The D 112 input is the data input and the En 114 input is the enable input that enables or disables the latch 110. The output of the latch is given by Q 116. Knowing the function of the D-latch, the next step is to determine the structure of the D-latch. In this case how the D-latch component is constructed from NAND gate sub-components is determined (FIG. 5A). The following synthesizable VHDL code may be used to automatically generate at the design capture level 200 (phase 2), a schematic of a microfluidic network of connected microfluidic NAND gates:

```
entity LATCH is
    port (En, D,: in std_logic; Y: out std_logic);
end entity LATCH;
architecture GATE of LATCH is
    begin
        P1: process (En, D)
            begin
                if (En = '1') then
                    Y <= D;
                end if;
            end process P1;
end architecture GATE;
```

The above VHDL code shows that if the enable line (En 114) is "1" or H, then the output Q 116 gets the input D 112, otherwise the output Q 116 remains unchanged. This code infers a D-latch and generates the network of NAND gates in FIG. 7B, when executed by a synthesis tool.

Figure 7B:
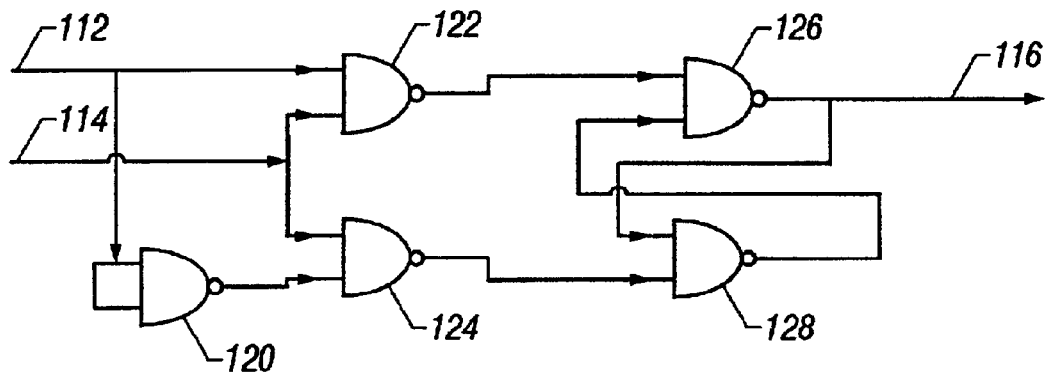
FIG. 7B shows the gates synthesized from the above VHDL code example of an embodiment of the present invention

FIG. 7B shows the gates synthesized from the above VHDL code example of an embodiment of the present invention. Each NAND gate (FIG. 5A) includes two pressure actuated normally open switches (FIG. 4H) and a high flow resistance channel (FIG. 4B). The inputs are D 112 and En 114 which go to a NAND gate 122. The input D 112 also goes through an inverter 120 to be input along with En 114 into NAND gate 124. The outputs of NAND gates 122 and 124 are the inputs into a S-R latch having NAND gates 126 and 128, where the output of NAND gate 122 is the $\overline{\text{SET}}$ and the output of NAND gate 124 is the $\overline{\text{RESET}}$ of S-R latch in FIG. 6A. The output D 116 is the output of NAND gate 126 and the D-latch 110.

Thus the example of FIGS. 7A and 7B shows how synthesizable code may be used to generate a microfluidic network of microfluidic components, where the components may be automatically chosen from a library, such as, Macro Library 210 and Basic Library 206 and placed on a schematic 202 by a synthesis CAD tool. Since the VHDL code is executable and has the D-latch function represented by an "if (En='1') then Y<=D" statement, microfluidic simulation of the control logic may be done using the VHDL code in a conventional VHDL simulator. In addition the VHDL statement "Y<=D" may be changed to "Y<=D after 5 μsec" to incorporate timing aspects. This simulation allows the verification of the control logic for the microfluidic circuit and is part of the Functional Analysis 360 (phase 3).

Using the above fluidic D-latch (or an equivalent D-Flip Flop with the enable replaced by a clock) and fluidic NAND gate, a Finite State Machine (FSM) can be built, for example, a one-hot FSM. Thus in one embodiment of the present invention a microfluidic computer may be built. With the components made of organic rather than inorganic material a biological computer may also be constructed. Other synthesizable designs using a Hardware Description Language can be found in Douglas J. Smith, "HDL Chip Design, A Practical Guide for Designing, Synthesizing and Simulating ASIC's and FPGAs using VHDL or Verilog," Doone Publications, Madison, Ala. 1997 which is incorporated herein by reference.

In addition to digital circuits, the above-referenced Provisional Patent Application No. 60/282,253, entitled "Microfabricated Fluidic Circuit Elements And Applications," filed Apr. 6, 2001, discloses analog circuits, for example, switching regulators, capacitors, pressure multipliers, and pressure sources. In an embodiment techniques similar to those used for the synthesis of microwave circuits, such as given in U.S. Pat. No. 5,031,111, entitled "Automated Circuit Design Method," by Chao, et. al, filed Aug. 8, 1988, may be used with microfluidic components in place of microcells.

In another embodiment VHDL-AMS (Analog and Mixed Signal) (i.e., IEEE Standard 1076.1-1999 (http://www.vhdl.org/analog) or Verilog AMS) may be used for the synthesis and simulation of analog, and/or mixed digital/analog systems at several abstraction levels (e.g., functional, behavioral, macrocell/RTL, and device levels). Thus with the use of microfluidic components described above, VHDL-AMS is used in one embodiment of the present invention to simulate a mixed signal or analog design for functional analysis 360 (phase 3) and to synthesize the design from the VHDL-AMS programming code to connected microfluidic components (i.e., automatically generate phase 2) displayed on a schematic entry tool.

The following example is of VHDL_AMS code for a valve (see "VHDL-AMS Code For A Electrostatically Driven Micropump," by Feng Cao, Sep. 28, 1999, Microfluidic Operations and Network Architectural Characterizations (MONARCH) Project, Department of Electrical and Computer Engineering, Copyright 1999, Duke University):

```
packagefluidic_system is
    SUBTYPE    pressure IS real;
    SUBTYPE    flow_rate IS real;
    NATURE fluidic is
        pressure ACROSS
        flow_rate THROUGH
        fluidic_ref REFERENCE;
end package fluidic_system;
library ieee;
use work.fluidic_system.all;
use ieee.math_real.all;
entity valve is
    generic  ( EffectiveMass : real;
               DampConst : real;
               SpringConst : real;
               area : real;
               mu : real;
               density : real;
               length : real );
    port ( terminal p, m : fluidic );
end entity valve;
architecture config of value is
    constant pi : real :=3.14159;
    quantity freq0, y, ydot : real;
```

-continued

```
    quantity valvepres across valveflow through p to m;
begin
    ydot == y'dot;
    y == ( 1.4e-6*valvepres - 2.36e-6*ydot'dot - 0.00259*y'dot )/155.0;
    absy == (y + abs(y))/2.0;
    if y < 0.0   use valveflow == 0.0;
    else
        if valvepres > 0.0    use
            valveflow == mu*4.0*length*sqrt(2*valvepres/density)*absy;
        else
            valveflow == -mu*4.0*length*sqrt(2*valvepres/density)*absy;
        end use;
    end use;
end architecture config;
```

Design Capture (Phase 2)

Once the design has been conceptually defined, it can then be captured with a schematic entry tool 202 that is used to select the components and connect between the input/output ports of components, or the schematic may be automatically generated using a synthesis language, as described above.

Figure 8:
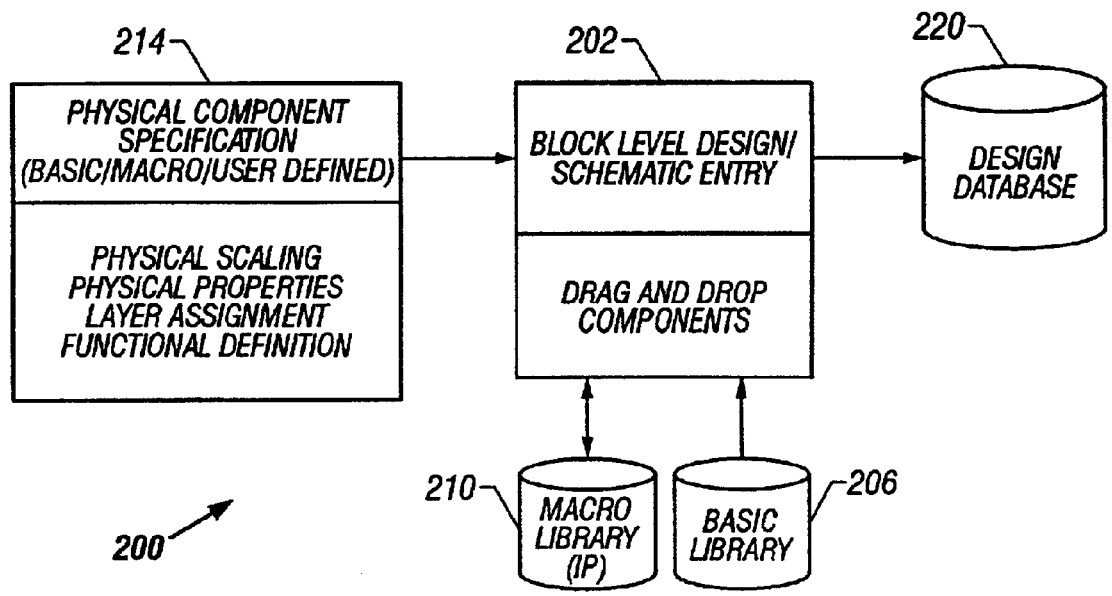
FIG. 8 shows a simplified block diagram of phase 2, design capture, of an embodiment of the present invention.

FIG. 8 shows a simplified block diagram of phase 2, design capture 200, of an embodiment of the present invention. For manual creation of the design, schematic entry 202 enables the quick creation of designs through the use of library components in libraries 206 and 210. There are basic library components 206, for example, valves, pumps, lenses, mixing chambers, input chambers, output/waste chambers, or interconnects (or vias). A via is a vertical connection through one or more layers. The basic library components 206 are components which are either user or pre-defined. There are also macro library 210 components, for example, a cell sorter macro or a DNA fingerprint macro. The library components may or may not be normalized.

Examples of library components used in this embodiment of the present invention are given in the above-mentioned PCT Patent Application No. PCT/US00/17740, entitled "Microfabricated Elastomeric Valve and Pump Systems," filed Jun. 27, 2000 and in Provisional Patent Application No. 60/282,253, entitled "Microfabricated Fluidic Circuit Elements And Applications," filed Apr. 6, 2001 which are incorporated herein by reference. Examples of microfluidic components and structures are summarized in Appendices A and B.

In one embodiment each component in the libraries 206 and 210 has a physical component specification 214. The specification may have, for example, one or more of the following: designation of the channel as a control or fluid channel, physical scaling of channels (length, width, depth), control or fluid channel attributes, such as if a channel end is open or closed, or if a channel is square or rounded, physical properties, such as, thermal, conductivity, viscosity, or magnetic properties, layer assignment, a functional description (digital or analog), a component and/or a fixed element name, and/or a design rule specification for physical layout.

FIGS. 9a and 9b show the top plan view and perspective view of an on-off valve component of an embodiment of the present invention. The top plan view shows the control length 232 and control width 234 of the control channel 246 and the fluid width 238 and fluid length 233 of the fluid channel 242. The perspective view shows the fluid depth 244 of the fluid channel 242 and the control depth 248 of the control channel 246. The channels 242 and 246 are semi-rounded.

Figure 12:
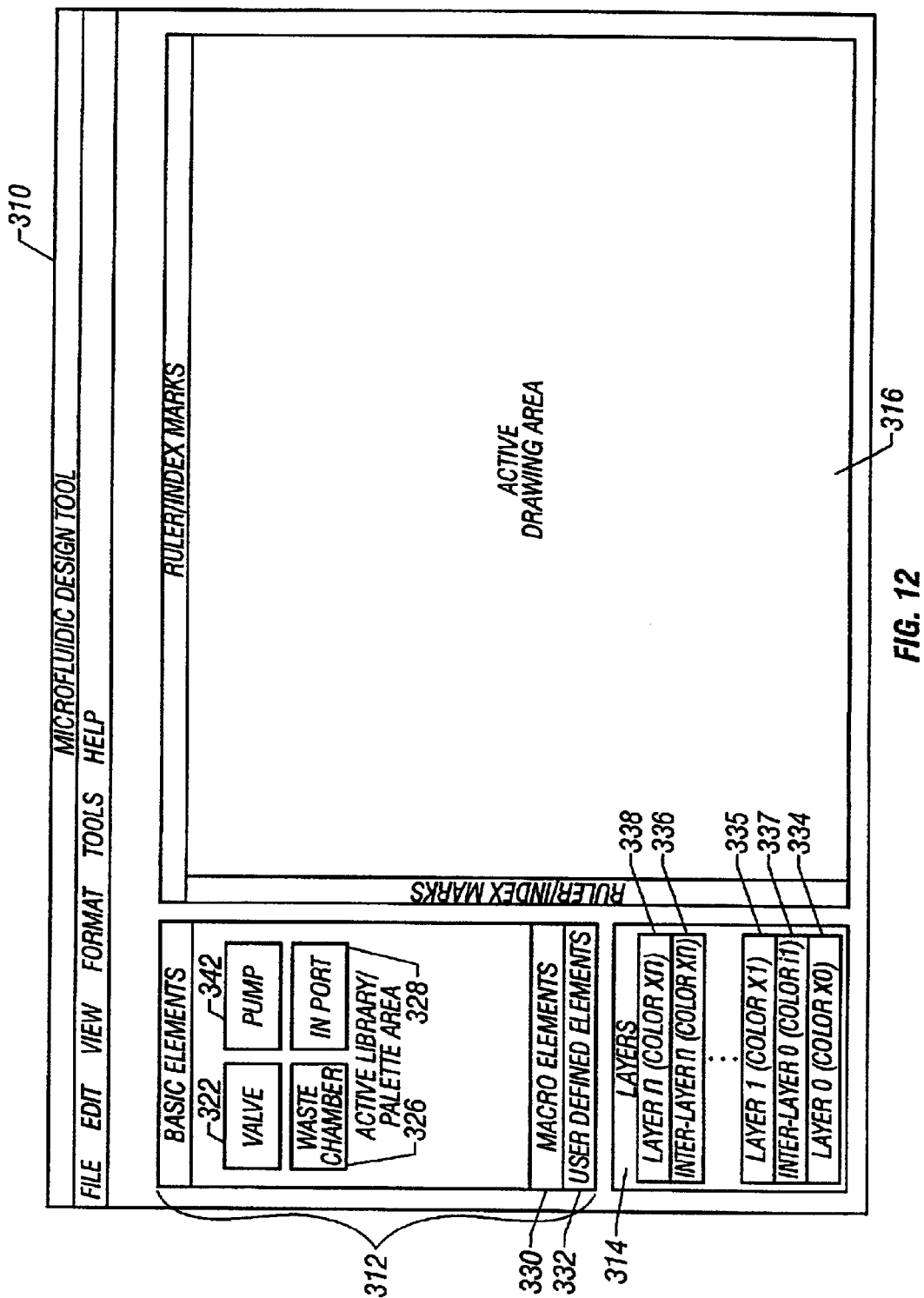
FIG. 12 illustrates a schematic capture display window of embodiment of the present invention.

One example of the Physical Component Specification 214 for the on-off valve in FIGS. 9a and 9b includes:

Physical dimensions (nm)
Fluid Channel Width
Fluid Channel Depth—Linked by assigned layer
Fluid Channel Depth_I—Independent of layer depth
Fluid Channel Length
Control Channel Width
Control Channel Depth—Linked by assigned layer
Control Channel Depth_I—Independent of layer depth
Control Channel Length
Element Attributes
Control Channel Left End (0—close, 1—open)
Control Channel Right End (0—close, 1—open)
Fluid Channel Left End (0—close, 1—open)
Fluid Channel Right End (0—close, 1—open)
Control Channel Profile (0—rounded [default-blue], 1—square)
Fluid Channel Profile (0—rounded [default-blue], 1—square)
Layer assignment (integer number 0–n, where n is a positive integer)
Fluid Channel Layer—n
Control Channel Layer—n+1 or n−1
Component Name Assignment (for example, any alpha string up to 64 bytes long excluding whitespace and "/" and "\")
CompName
Fixed Element Name
ElementName The On-Off valve component may be represented by a block diagram such as FIG. 10 or a schematic symbol to be displayed in FIG. 12. The valve symbol in FIG. 12 may be in Basic Library 206 and dragged and dropped onto a schematic entry 202 active drawing area 316 such as that shown in FIG. 11.

FIG. 10 shows an IDEF0 diagram representing a microfluidic component of an embodiment of the present invention. IN 256 is the input into process 252, which responsive to control 254 outputs out 258. This may represent, for example, a valve in which the input, IN 256, is transferred to the output, OUT 256, if the CONTROL 254 turns the PROCESS 252 on. Note that FIG. 10, when representing a valve, is a more abstract representation of FIG. 11.

FIG. 11 shows a microfluidic valve symbol of an embodiment of the present invention. The fluid channel 262 has input end 263 and output end 264. The control channel 266 has input end 267 and a closed output end 268. When fluid (liquid or gas) flows in the control channel 266, the fluid channel 262 it is shut off and the fluid (liquid or gas) stops flowing, i.e., the valve 260 is turned on. Otherwise, the valve 260 is normally off (i.e., open) and the fluid (liquid or gas) in the fluid channel 262 keeps flowing. The valve in FIG. 11 is a multilayered symbol. The fluid channel is on a different layer from that of the control channel. From FIG. 12, for illustration purposes, let layer 1 335 represent the control layer and layer 0 334 represent the fluid layer. Then with layer 0 334 selected and layer 1 unselected the fluid channel 262 is displayed and can be connected to another fluid channel. With layer 0 334 unselected and layer 1 selected the control channel 266 is displayed and can be connected to another control channel.

FIG. 12 illustrates a schematic capture display window 310 according to an embodiment of the present invention. The window 310 includes an area showing the library components 312, an area 314 showing the layers selected and an active drawing area 316 were the component symbols from active library area 320 are dragged and dropped and connected together. The layered area 314 is used when there are multilayered component symbols in library components area 312. The layered area 314 controls which layer(s) in the active drawing area 316 is/are active. If, for example, only one layer is active then only the components or parts of components on that layer are displayed and can be modified or acted upon. The layers include major layers, for example, layer n 338, layer 1 335, and layer 0 334, and sub-layers, for example, inter-layer n 336 and inter-layer 0 337. The sub-layers are layers in between the major layers. For ease of viewing each layer may have its own associated color for the channels on that layer.

Figure 13A:
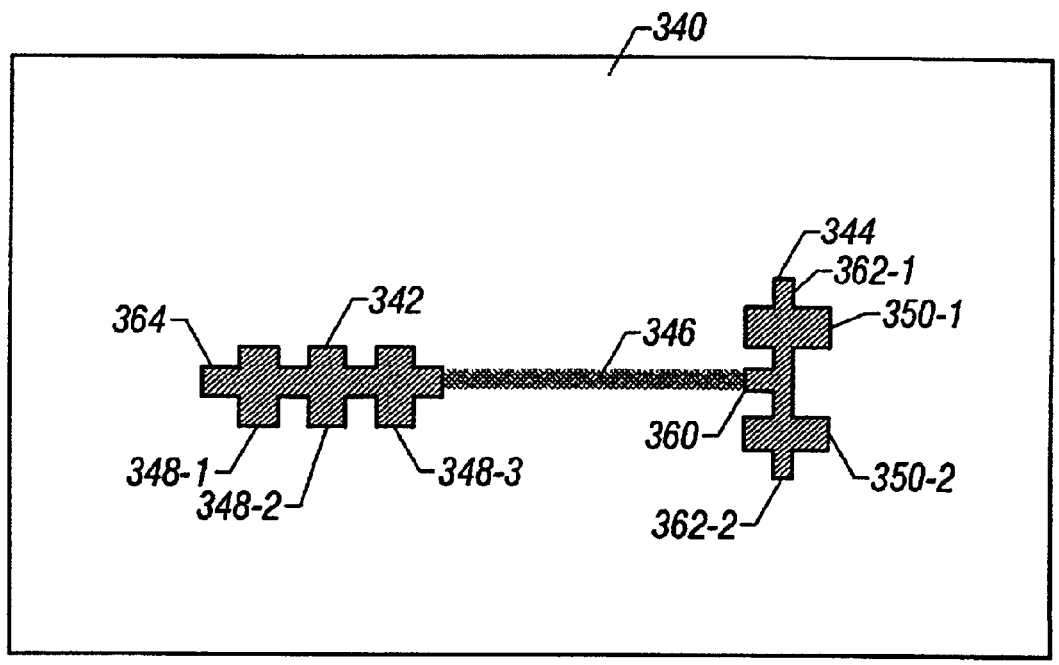
FIG. 13A shows an example of a peristaltic pump connected to a T-switch in an expanded drawing area of FIG. 12 of an embodiment of the present invention.

FIG. 13A shows an example of a peristaltic pump 342 connected to a T-switch 344 in an expanded drawing area 340 of the window 310 of FIG. 12 in an embodiment of the present invention. The peristaltic pump 342 is a basic component that allows the active control of fluid in either direction. Each of the control channels 348-1, 348-2, and 348-3, are pressurized (and depressurized) in some order to create a pumping effect in the fluid channel 364. The T-switch 344 represents a basic component that is used to direct the incoming flow 360 in the fluidic channel to none or one of two channels, 362-1 or 362-2, based on the state of the control channels 350-1 and 350-2. The peristaltic pump 342 is first selected from the active library/palette area 320 and dragged and dropped into the drawing area 316. Next the T-switch is selected and dragged and dropped into the drawing area 316. The peristaltic pump 342 is then connected to the T Switch 344 via a fluid channel 346. The function of the microfluidic network in FIG. 13A is to pump a fluid into one of two directions 362-1 or 362-2.

Figure 13B:
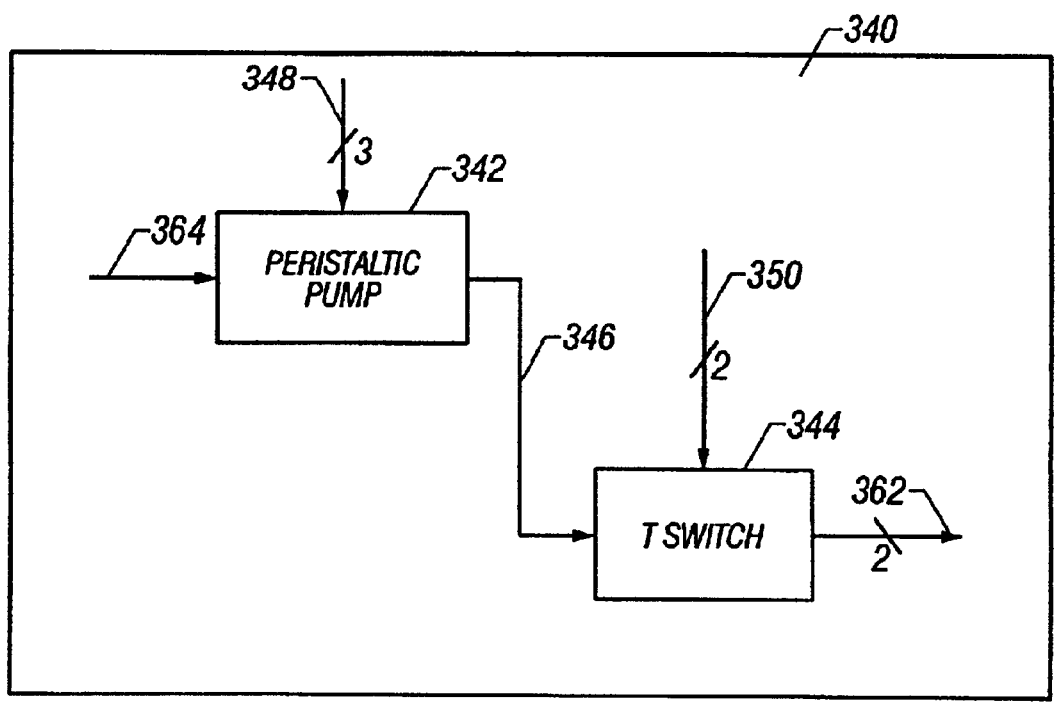
FIG. 13B shows an example of using IDEF0 blocks to perform schematic capture in another embodiment of the present invention.

FIG. 13B shows an example of using IDEF0 blocks to perform schematic capture in another embodiment of the present invention. The peristaltic pump 342 has input 364 and control bus 348 having three control lines. The output of the peristaltic pump 342 is connected via line 346 to the T-switch 344. The T-switch 344 has a control bus 350 having two lines and an output bus 362 having two lines. The microfluidic network schematically captured in FIG. 13B is the same as that of FIG. 13A, but with more abstract symbols.

As shown in FIG. 8, from the schematic entry 202, a design database 220 is produced that represents the interconnected components. This design database 220 serves as input into the functional analysis 360 and the physical implementation 400.

Functional Analysis (Phase 3)

After completion of the schematic design entry, a good design practice to reduce the number of design iterations is to functionally simulate the design. Functional simulation of microfluidic circuits involves application of control signals to the active components of the design and shows the functional/static behavior of the design without regard to the dynamic behavior of the fluid within the device. Examples of active fluidic components include valves and pumps which act on the fluid. A fixed channel is an example of a passive fluidic component. Functional libraries 362 for the component models are provided for each component (FIG. 1). In one embodiment the component functional models are computer programs written in C, C++, VHDL, Verilog, Verilog-A, VHDL-AMS, or Verilog-AMS, and are executed by a commercial simulator, such as from Synopsys, Inc. of Mountain View, Calif., or Cadence Design Systems, Inc. of San Jose, Calif.

Figure 14:
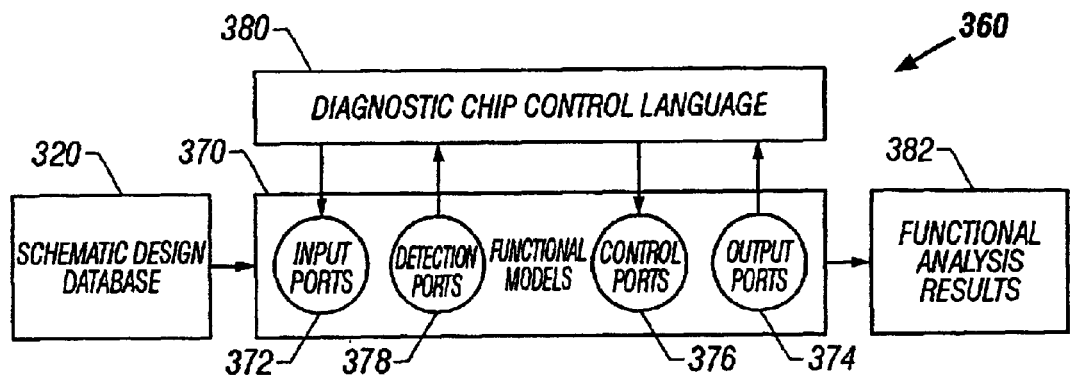
FIG. 14 shows a simplified block diagram for the connected component functional models of the functional analysis of the MCAD system of an embodiment of the present invention.

FIG. 14 shows a block diagram for the connected component functional models of the functional analysis 360 of the MCAD system 10 according to an embodiment of the present invention. Components are extracted from the schematic design database 220 and are used to select the associated component functional models from the functional simulation library 362 (FIG. 1). These component functional models are connected together as given by the schematic design database 220 for the microfluidic circuit being simulated.

In one embodiment of the present invention, the logical fluidic flow simulation 366 simulates the control logic of the active microfluidic components (FIG. 1). The purpose is to give an initial validation of the logic control 364 and to insure proper connectivity in the microfluidic circuit. In this case the functional models in the functional simulation library 362 includes models defined as Boolean expressions with operands based on the control port(s) 376 of the active component which control connections to the input ports 372 and the output ports 374. Valid Boolean operators are as follows: *=AND, +=OR, ^=XOR, !=NOT.

For example, a simple valve component with a single input port and a single output port and a control port can be defined as follows:

Input=I, Output=O, Control=C
Functional Model Valve
Port I: input
Port O: output
Port C: control
O=I*C When C=H (or '1'), then the output O gets the input I. When C=L (or '0'), then O=L regardless of the value of the input I.

Logical fluidic flow simulation 366 of the logic control 364 of the testing apparatus that will actuate the active components (FIG. 1) is created using the diagnostic device control language or diagnostic chip control language (DCCL) 380, as shown in FIG. 14. The DCCL 380 is a simple Boolean based language with timing constraints that can generate control signals to simulate actuation of the device's active components and read and log data from detection ports 378 of the functional models 370. Any additional physical characteristics of the control and input signals can be included for the physical simulation but are ignored in the functional simulation. Consequently, the same DCCL program can be used in the actual testing when the device is ultimately fabricated and put into use by the user. The results of the simulation are shown in the functional analysis results 382 and are displayed as a series of square waves that indicate valve position, path connectivity, detection, control signal generation, etc.

In another embodiment the functional models are VHDL or Verilog models. A valve can be represented by the VHDL expression:

O<=I and C after 5 μsec;

where "and" is a Boolean operator and there is a delay of 5 μsec before the result of the and operation is assigned to O. The DCCL of the above embodiment is represented in this embodiment as a typical VHDL test bench. As seen in FIG. 14 the test bench supplies over time the inputs to some of the input ports 372, primarily to the input ports 372 associated with the inputs to the microfluidic circuit given by the connected functional models 370. The test bench analyzes the output ports 374 associated with the outputs of the microfluidic circuit given by the connected functional models 370. The test bench also monitors intermediate points in the connected functional models 370 by monitoring various detection ports 378. The functional analysis results 382 may be displayed by a commercial VHDL simulator as timing diagrams or waveforms.

In yet another embodiment VHDL-AMS or Verilog-AMS is used to represent the Functional Models 370. The inputs into the control ports 376 are typically digital, while the functional transformation of values from the input ports 372 to the output ports 374 are given by analog functions. Thus a first order dynamic analysis may be done. This allows an intermediary analysis between the static connectivity analysis and the physical analysis 800 given by phase 6 (FIG. 1).

In a further embodiment an analysis of the fluid flow only may be performed in a way similar to that for passive microfluidics (see "Passive Microfluidics—Ultra-Low-Cost Plastic Disposable Lab-On-A-Chips," by Bernard H. Weigl, et. al., in Proceedings of Micro Total Analysis Systems 2000, Dordrecht, Netherlands: Kluwer Academic Publishers, 2000, p. 299). Assuming the fluid is flowing through the fluid channels and the pertinent control channels are turned on, the microfluidic circuits may be represented by analog electrical components, such as capacitors, resistors, and inductors, to predict fluid flow rates. Diffusion and chemical reactions may be calculated using finite element analysis. Thus an initial analysis of the fluid flow and fluid mixing through the fluid microcircuits may be obtained. This again is neither a static nor a full dynamic analysis, but somewhere in between, i.e., an intermediary analysis.

Physical Implementation (Phase 4)

Figure 15:
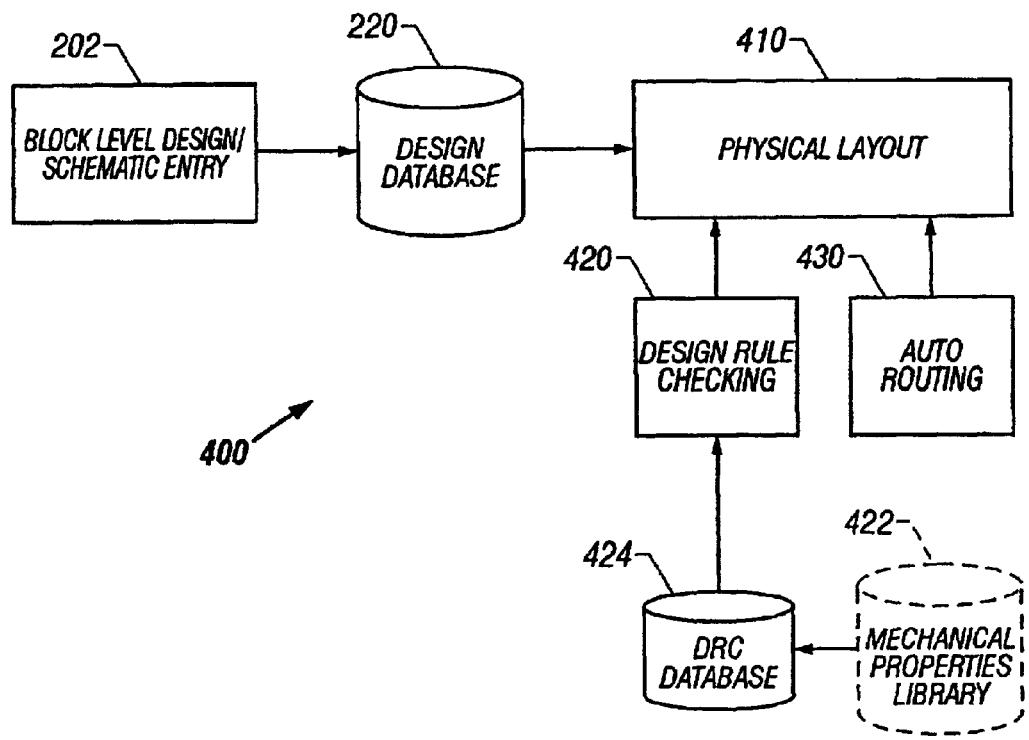
FIG. 15 shows a simplified block diagram of the physical implementation of an embodiment of the present invention.

Once the schematic design has been completed and functionally tested, the physical implementation of the schematic into a physical layout takes place. FIG. 15 shows a block diagram of the physical implementation 400 according to an embodiment of the present invention. The design database also is developed based on the schematic entry 202, as shown in FIG. 8 and described above. The design database 220 represents the interconnected components which are then assigned to physical layers, via a place and route routine, either automatically or manually.

While a tool such as AutoCAD® from Autodesk, Inc. of San Rafael, Calif., may be used to physically lay out a microfluidic circuit, it has several disadvantages. AutoCAD® has no drawing constraints as it is a general tool. Hence, for example, a control channel can overlap a fluid channel causing an unwanted parasitic valve. While this tool is capable of multiple layers, components are typically drawn on one layer only. Manipulation of a multilayered component presents serious difficulties. AutoCAD® does not have the concept of an I/O port and connectivity to an I/O port. Again since AutoCAD® is a general CAD program, there is no design information associated with a component such as functional information. Embodiments of the present invention overcome these disadvantages of AutoCAD® and other similar tools, and provide a system in which a microfluidic circuit can be easily and efficiently created using multilayered microfluidic components on a physical layout. There are two primary aspects to the physical layout 410 of the microfluidic circuit or system or device. The first is component placement and the second is the routing of the interconnections between the placed components.

Components can be either manually or automatically placed in the MCAD system's placement tool. The placement tool includes one or more of the following functions: allowing the grouping of components by connectivity by layer and/or by cross layer (3D grouping); placing components based on design rule constraints (DRC) in the DRC database 424 from set mechanical properties per layer provided in the mechanical properties library 422; performing design rule checking 420; allowing for grid and gridless placement of components; highlighting DRC errors; performing layer to layer shrinkage compensation for placements; and/or reading and writing the DWG, DXF, or other appropriate file formats.

Examples of DRC's include checks on I/O placement, channel size mismatch, dangling channels, overlapping components & channels, and channel spacing.

Figure 16A:
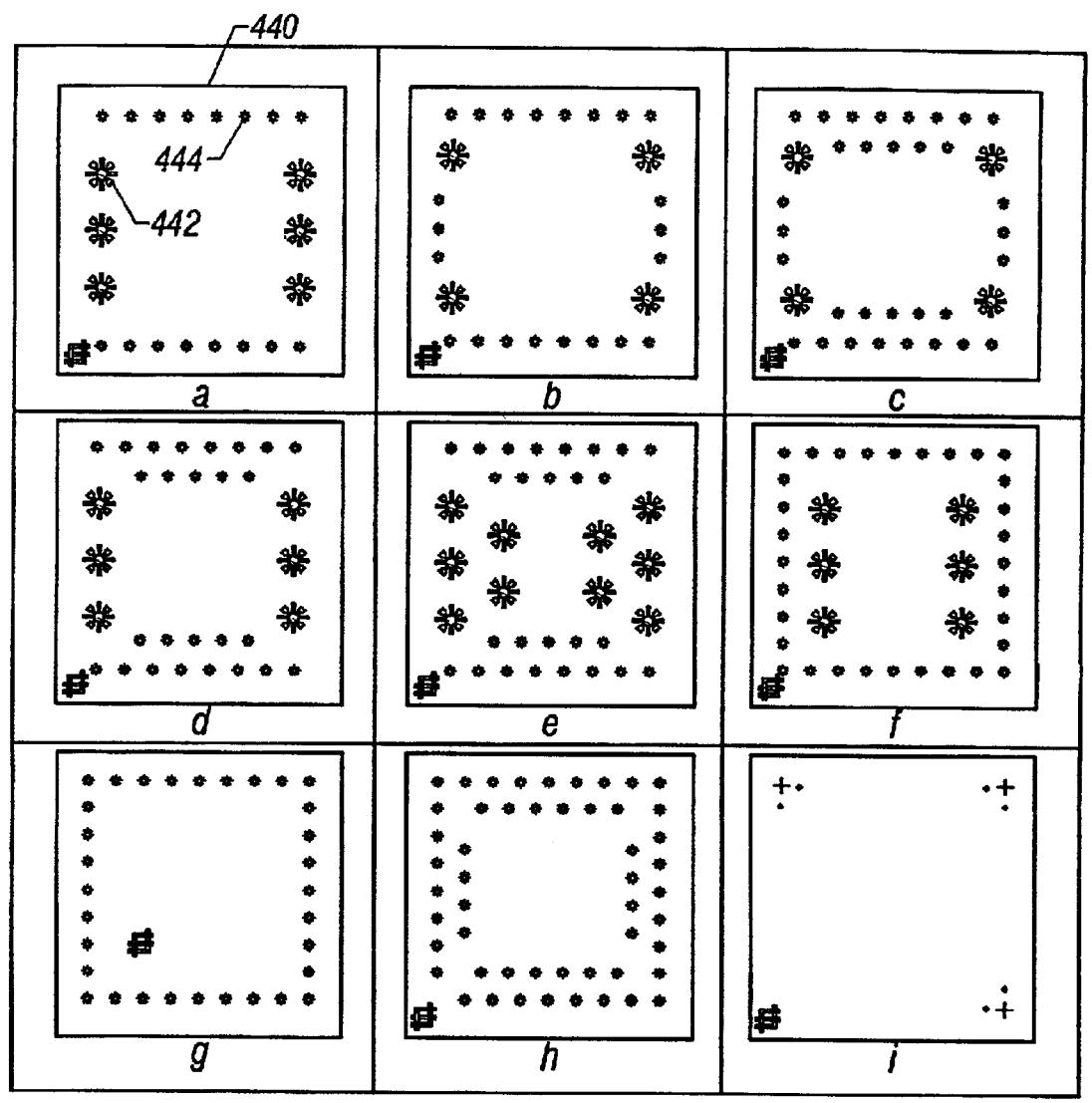
FIGS. 16A and 16B give examples of pre-defined templates of an embodiment of the present invention.
Figure 16B:
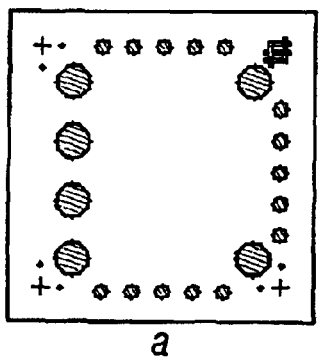
Figure 16B:
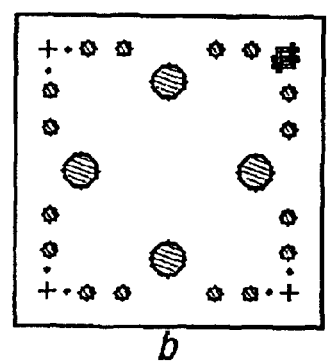
Figure 16B:
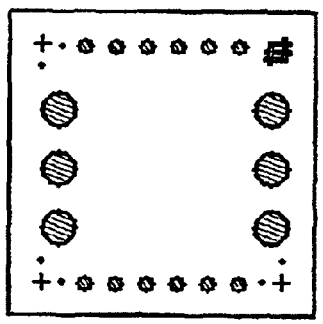
Figure 16B:
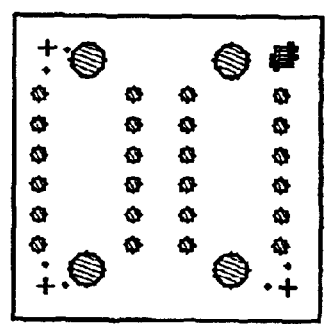
Figure 16B:
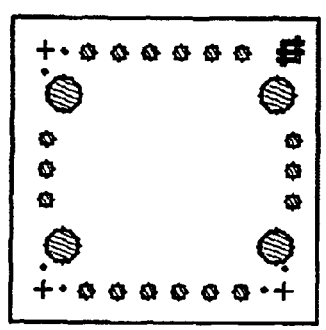
Figure 16B:
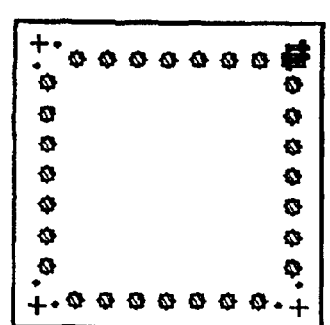

An I/O placement rule may restrict a user to a set of pre-defined templates having pre-defined I/O ports. FIGS. 16A and 16B give examples of pre-defined templates of an embodiment of the present invention. For example, a template 440 may correspond to a microfluidic chip that is approximately a 20 mm×20 mm square in size and about 4 mm thick. The I/O ports 442 and 444 correspond to a large via about 3 mm and a small via about 625 μm, respectively. In an alternative embodiment the user may create his/her own template and may place the I/O ports on the user-designed template.

A channel size mismatch rule allows checks for component channels (i.e., channels that are part of the component) to connecting channel having size mismatch and channel-to-channel size mismatch.

A dangling channel checking rule checks for two or more unconnected ports per component channel (only one end of a component channel need be connected) and for only one connected port on a user drawn channel (both ends of channels must be connected).

An overlapping channels rule allows checking for overlapping user drawn fluidic and control channels. There is an error for any overlapping channels. If there is auto-bridging then one or both channels are re-shaped at and within a predefined distance of the overlap point and no error occurs. Other overlapping components & channels rules check for overlapping channels on the same layer and overlapping components on the same layer or on another layer. Again if there is auto-bridging, two overlapping channels on the same layer may be corrected by routing one channel to another layer and back again using vias.

A channel spacing rule checks for minimum spacing between adjacent channels of a predetermined width. For example, there may be required a minimum of 30 μm between adjacent 120 μm width channels, a minimum of 50 μm between adjacent 100 μm width channels, and a minimum of 70 μm between adjacent 80 μm width channels, Next the interconnections between the placed components can be either manually or automatically done in the MCAD system's routing tool. The routing tool includes one or more of the following functions: definition of routing cross-sectional profiles; auto-routing 430 for similarly pitched components—grid or gridless; optimization of routing corners: right angle, radius, etc.; relocation of routing to other layers; layer to layer shrinkage compensation; and/or auto-bridging either intra or inter layer, where inter-layer bridging is done using vias.

In an embodiment of the present invention there are two types of bridging performed by the auto routing 430 (FIG. 15). The first type is an interconnect bridge channel which is used when a control channel on one layer overlaps a fluid channel on an adjacent layer. The interconnected bridge channel prevents the fluid channel from being closed when the control channel is activated. The second type is needed, when there is a crossing between a first and a second channel on the same layer. This type of bridge uses vias to reroute the first channel to another layer to detour around the second channel.

Figure 17A:
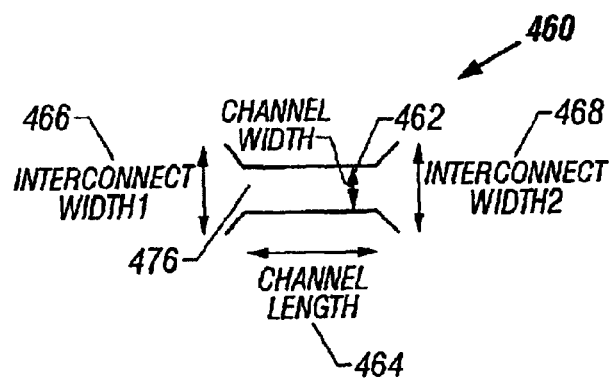
FIG. 17A shows the physical dimensions for an interconnect bridge channel of an embodiment of the present invention.

FIG. 17A shows the physical dimensions for an interconnect bridge channel 460 of an embodiment of the present invention. The interconnect bridge channel has channel width 462 and channel length 464. Both ends of the interconnect bridge channel have widths greater than the middle portion with one end having interconnect width 466 and the other end having interconnect width 468.

Figure 17B:
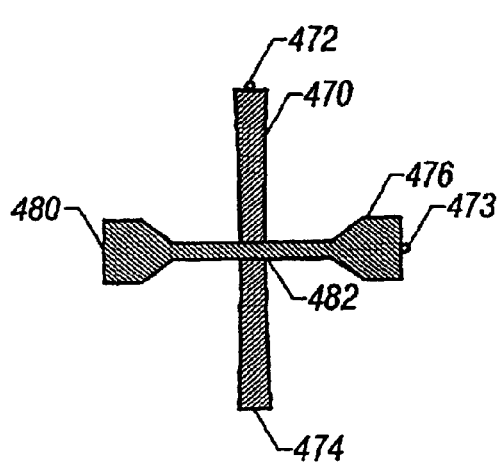
FIG. 17B shows a symbol for an interconnect bridge of one embodiment of the present invention.

FIG. 17B shows a symbol for an interconnect bridge of one embodiment of the present invention. The fluid channel 470 is on a first layer with ends 472 and 474. The control channel 476 is on a second adjacent layer with ends 480 and 478. The control channel 476 is an interconnect bridge similar to that shown in FIG. 17A and it overlaps the fluid channel 478 at overlap area 482. The control channel 476 goes from a first channel width at end 478 through a taper element to a narrow channel width and through a taper element back to the first channel width at end 480. The fluid channel 470 is tapered in the middle near overlap area 482. The tapering is done to reduce the ability of the control channel to inhibit the flow in the fluid channel 470. The control channel 476 when activated does not stop the flow through fluid channel 470 and thus effectively bridges the fluid channel 470.

Figure 18A:
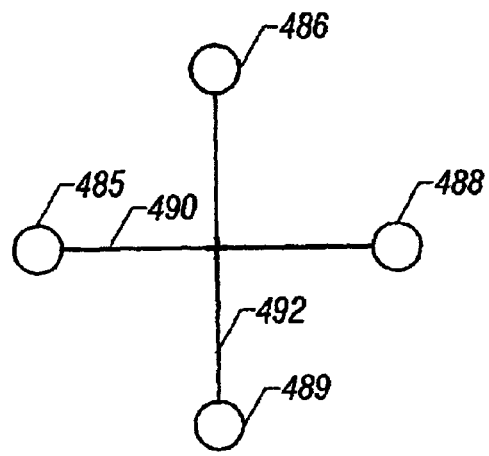
FIG. 18A shows a simplified view of a crossing of two channels located on the same layer.

FIG. 18A shows a crossing of two channels located on the same layer. In order to get from point 485 to point 488 and from point 486 to point 489 without going around any of the points, channels 490 and 492 must cross. In order to prevent this crossing, channel 490 must be detoured to another layer (alternately channel 492 could be detoured).

Figure 18B:
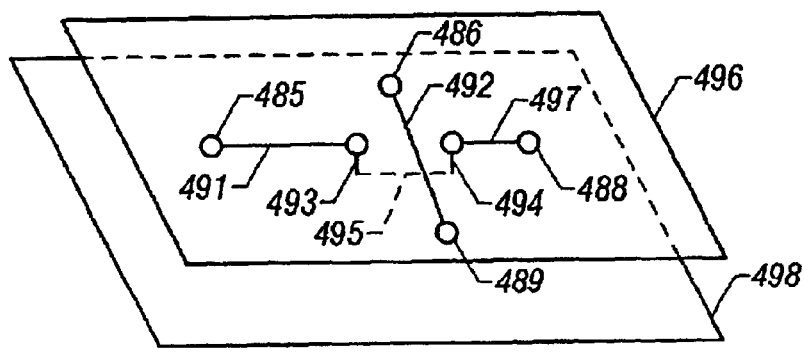
FIG. 18B shows a simplified view of an interconnect bridge channel using vias of an embodiment to of the present invention.

FIG. 18B shows an interconnect bridge channel using vias of an embodiment to of the present invention. From point 485 channel 491 on layer 496 is detoured through a via 493 to an adjacent layer 498 to channel 495. Channel 495 on layer 498 goes underneath channel 492 and then goes backup through via 494 to channel 497 to point 488. Thus channel 492 is bridged using another, but not necessarily adjacent, layer. In another embodiment channel 492 is detoured around channel 490.

Figure 19:
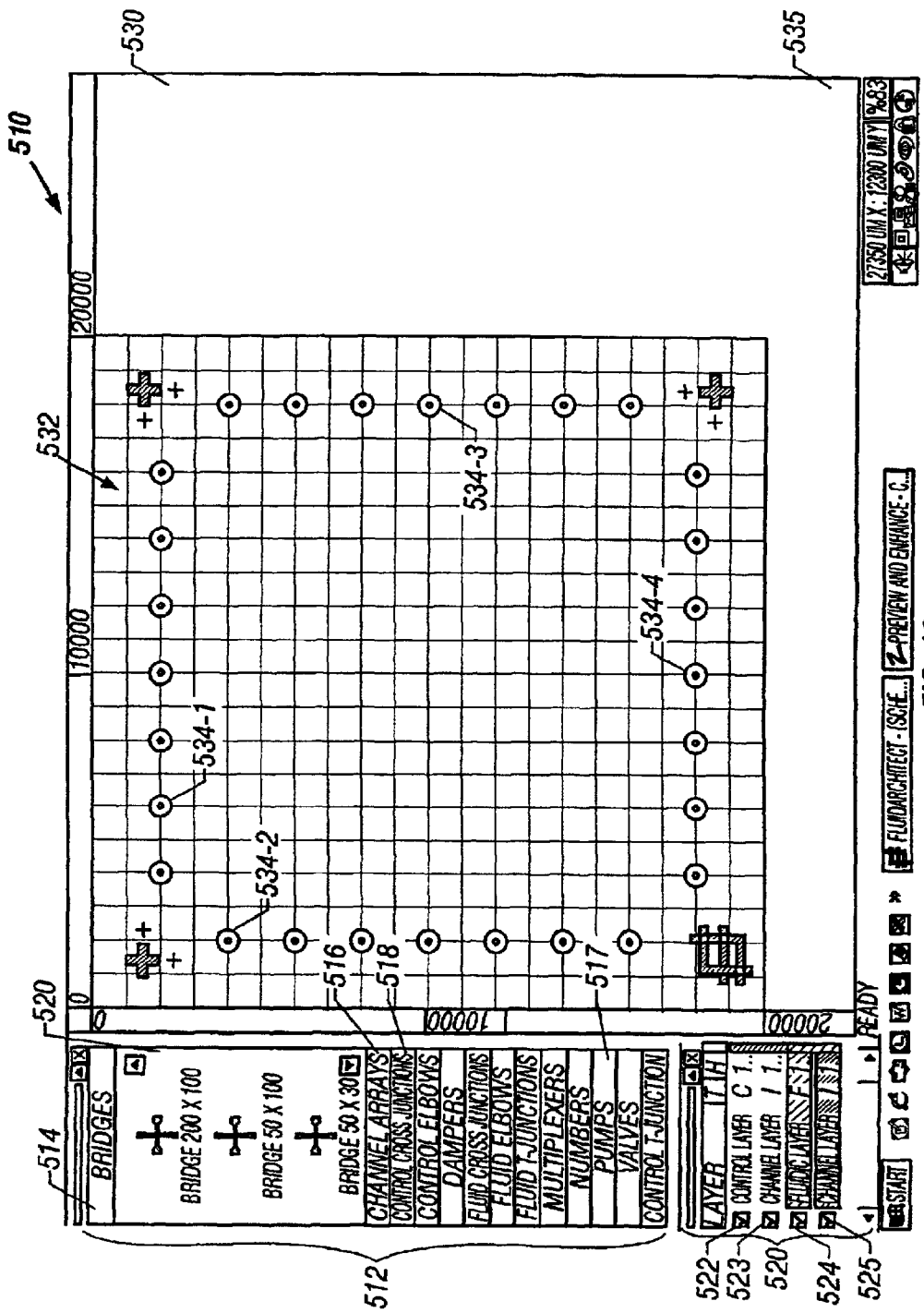
FIG. 19 shows a physical layout tool of one embodiment of the present invention.

FIG. 19 shows a physical layout tool according to one embodiment of the present invention. Typically, the difference between the design schematic capture 200 (phase 2) and the physical layout schematic 400 (phase 4) is that the former shows interconnected functional components without regard to placement on a template, while the latter takes into account the physical location on a template. In the physical layout 410, the physical characteristics of a microfluidic component are just as important as the functional characteristics of a component (both active and passive). In a schematic capture the symbols representing a component may be abstracted (e.g., FIG. 10) and the symbols are placed and connected, and no physical routing takes place. Also the placement in the schematic is not necessarily related to where the microfluidic component is physically located in the manufactured microfluidic chip or device. In a physical layout where the microfluidic component is placed is related to where the component is physically located. And routing places channels between microfluidic components to physically connect them.

For this embodiment, phase 1 to phase 3 are not performed and the user begins with phase 4. In this embodiment, the basic library 206 and macro library 210, which together include the components for the physical layout 410, feed the layout tool 510 directly and the schematic entry 202 is bypassed. In FIG. 19 the layout tool 510 displayed includes a component library area 512, a layer area 520, an active drawing area 530 and status bar 535.

The component library area 512 includes the library components, represented by symbols, that are available for the layout design. To select the portion of the library desired, one simply left clicks on the title of the portion (e.g., bridges 514, channel arrays 516, or pumps 517), and the components are displayed (e.g., active area 520 of bridges 514). If more than one component is present in the active area the up or down button is used to scroll through them. Once the proper component is found, one may left click the mouse button and hold and drag the component into the active drawing area 530 and release the button to place the component in a desired location.

Figure 20:
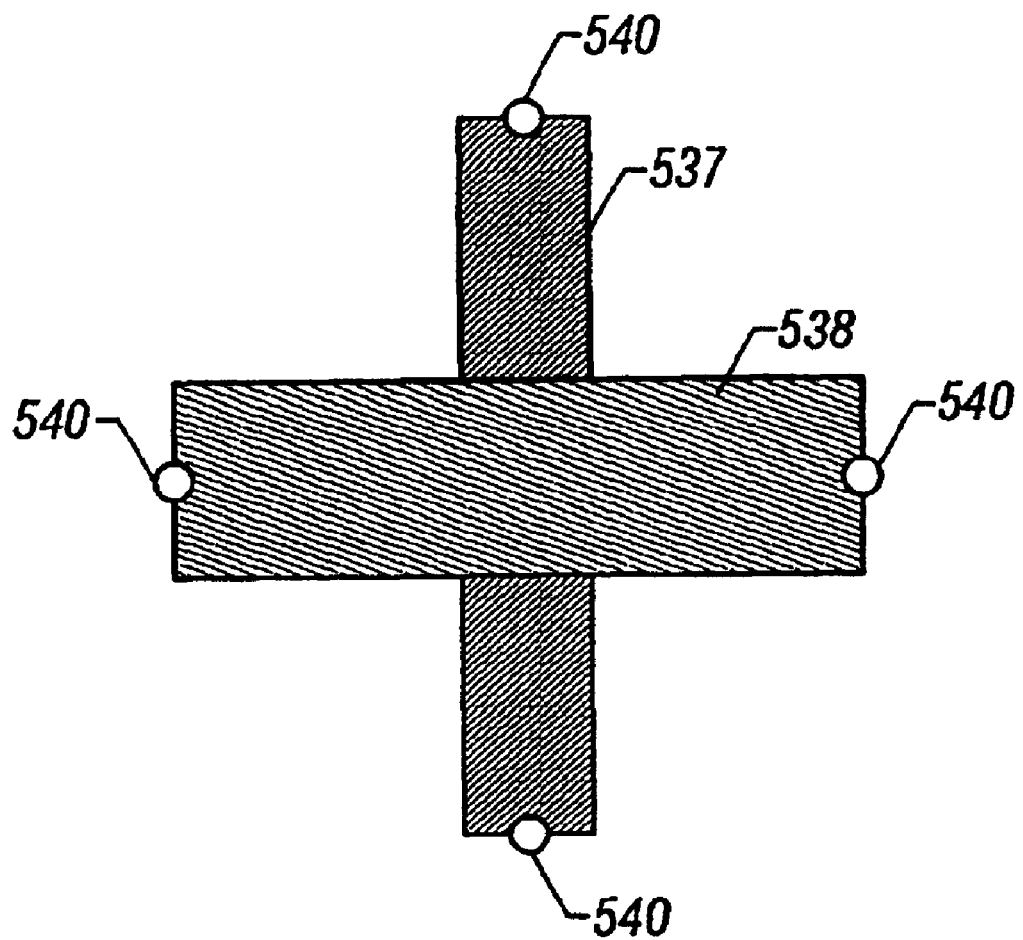
FIG. 20 shows a symbol for a microfluidic valve of one embodiment of the present invention.

A library component is typically composed of channels. Some components have channels only on one layer while some have channels on two or more layers. FIG. 20 shows a symbol for a microfluidic valve of one embodiment of the present invention. The black line 537 represents a fluid channel present on the fluidic layer while the gray line 538 represents a channel on the control layer. The colors have been picked for illustration purposes only and other colors such as blue for a fluid channel and red for a control channel are equally acceptable. The connection ports 540 are points where connections from other components or channels are allowed to be made with the valve component. Additional examples of the symbols or icons for the microfluidic components are provided in Appendices A and B which are herein incorporated by reference.

The layer area 520 in FIG. 19 indicates the coloring/shading of the layers as well as the different channel heights that are available in the particular layer. For example, control layer 522 and fluidic layer 524 are selected and thus both fluidic and control channels are shown in active drawing area 530. There are two categories of layers: primary layers, e.g., control layer 522 and fluidic layer 524, and channel layers, e.g., 523 and 525, in FIG. 19. The primary layer has a type, such as control or fluid, and includes one or more channel layers, e.g., control layer 522 has one channel layer 523, and fluid layer 524 has one channel layer 525. Channel layers inherit their type from their parent primary layer. Channel layers own channels, for example, drawn by the user or by auto-routing, in the active drawing area 530. Channels in a component, when placed on the drawing area 530, are linked to these user (or auto-route) drawn channels in the corresponding channel layer via the associated primary layer.

The active drawing area 530 is where components from the component library area 512 are placed and connected together using the drawing tools. In one embodiment the active drawing area includes a predefined template 532. The predefined template 532 has a plurality of I/O ports, for example 534-1, 534-2, 534-3, and 534-4. the components in component library area 512 are placed and connected on this template 532. Also connections are made from the connected components to the I/O ports.

The status bar 535 has two modes for the drawing area 530. One mode for the drawing area is the select mode (shown in FIG. 19) and the other is the channel drawing mode (not shown). In the select mode the status bar includes the following information: (1) Left Status Box: Component Name; (2) Center Status Box: Absolute Cursor Location (in microns); and (3) Right Status Box: Percentage Zoomed In. In the drawing mode (not shown) the status bar includes the following information: (1) Left Status Box: Length of channel drawn (in microns); (2) Center Status Box: Absolute Cursor Location (in microns); and (3) Right Status Box: Percentage Zoomed In.

Figure 21:
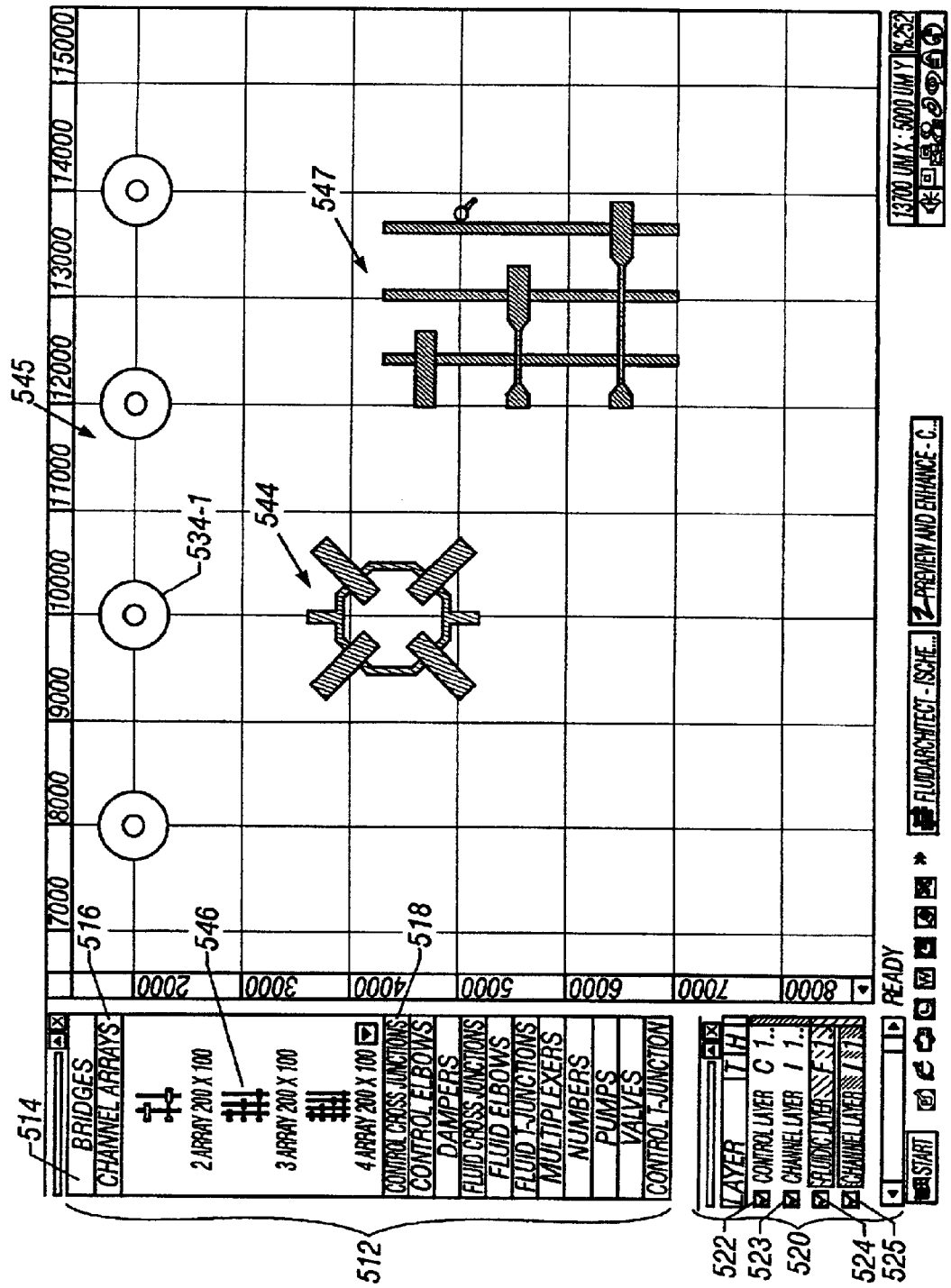
FIG. 21 shows two components of an embodiment of the present invention.
Figure 23:
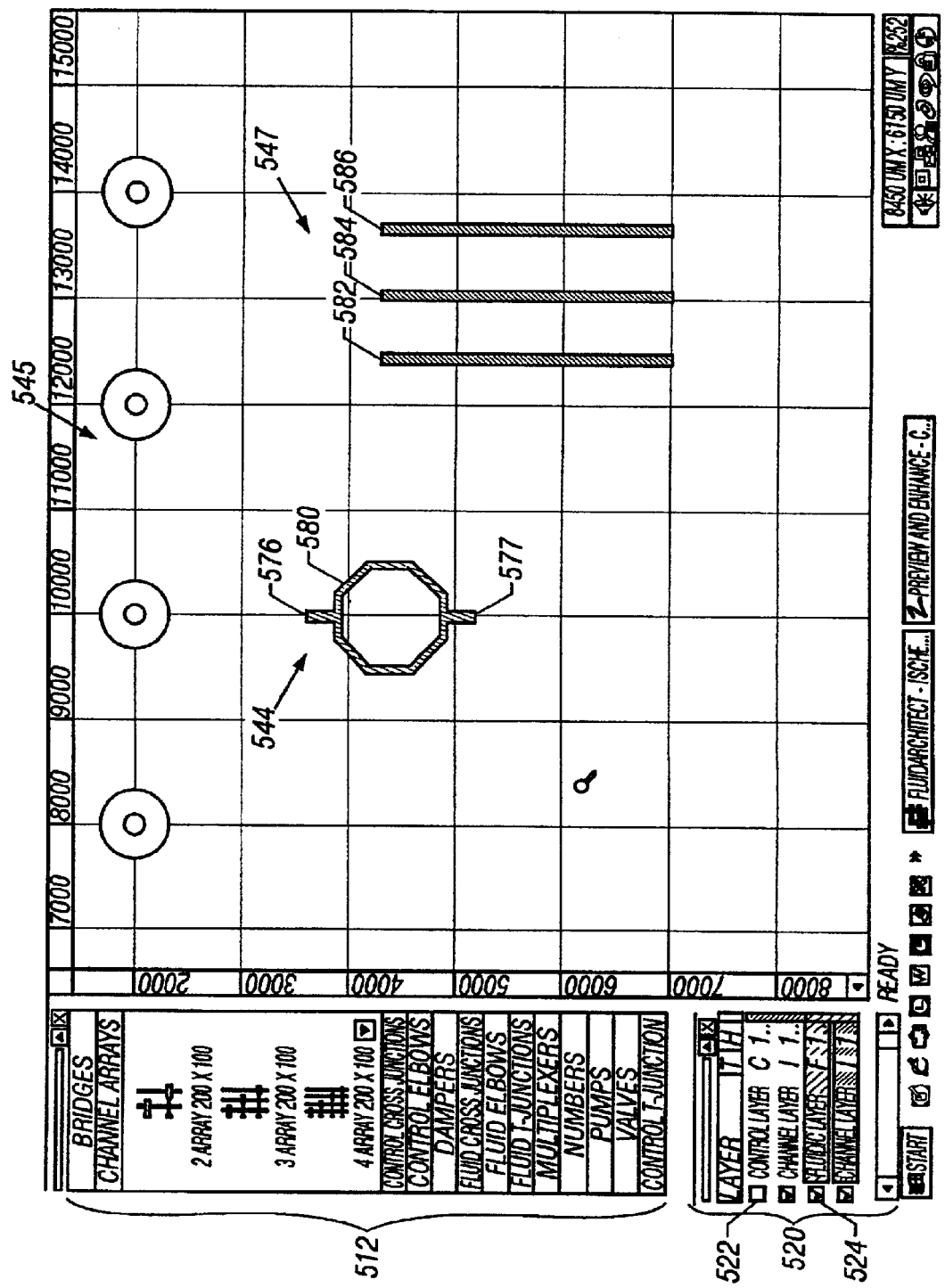
FIG. 23 shows the fluid channels for the fluid layer for the two components of FIG. 21.

FIG. 21 shows two components of an embodiment of the present invention. The two components shown on an expanded template area 545 are a rotary pump 544 and a channel array 547. The rotary pump 544 shown has a fluid channel 580 and two fluid ports 576 and 577 (FIG. 23). The rotary pump 544 is provided for mixing and incubating solutions by employing one or more pumps to flow solution around a circular flow channel. See, e.g., Stephen R. Quake and Axel Scherer, "From Micro- to Nanofabrication with Soft Materials," Science 290: 1536–40 (2000). The three channel array 547 provides a set of individually addressable flow lines 582, 584, and 586 (FIG. 23). The number of control lines is equal to the number of fluid lines for this array component. The flow of the liquid within the array can be controlled by actuating the necessary control lines.

Figure 22:
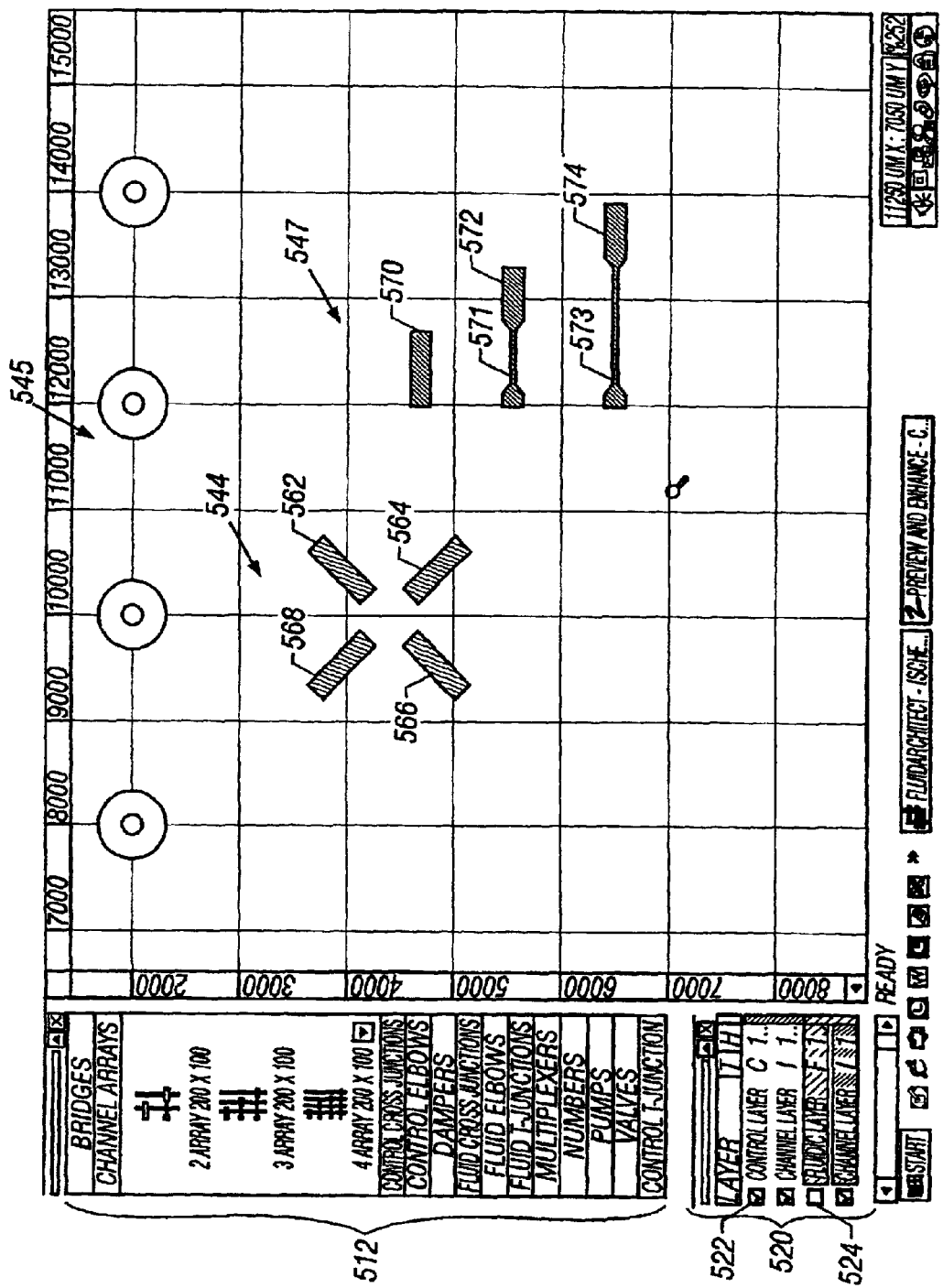
FIG. 22 shows the control channels on the control layer for the two components of FIG. 21.

FIG. 22 shows the control channels on the control layer for the two components of FIG. 21. In the layer area 520 the fluidic layer 524 is not selected and the control layer 522 is selected. This allows only the channels on the control layer to be viewed on the active drawing area 530. For the rotary pump 544 the control channels are 562, 564, 566, and 568. For the channel array 547 the three control channels are 570, 572, and 574. Channels 572 and 574 have narrow channel regions 571 and 573, so that the fluid channel 582 in the case of control channel 572 and the fluid channels 582 and 584 in the case of control channel 574 are not shut when control channel 572 or 574 is activated.

FIG. 23 shows the fluid channels for the fluid layer for the two components of FIG. 21. In the layer area 520 the fluidic layer 524 is selected and the control layer 522 is not selected. This allows only the channels on the fluid layer to be viewed on the active drawing area 530. For the rotary pump 544 there is one fluid channel 580 with two I/O ports 576 and 577. For the channel array 547 there are three fluid channels 582, 584, and 586.

Figure 24:
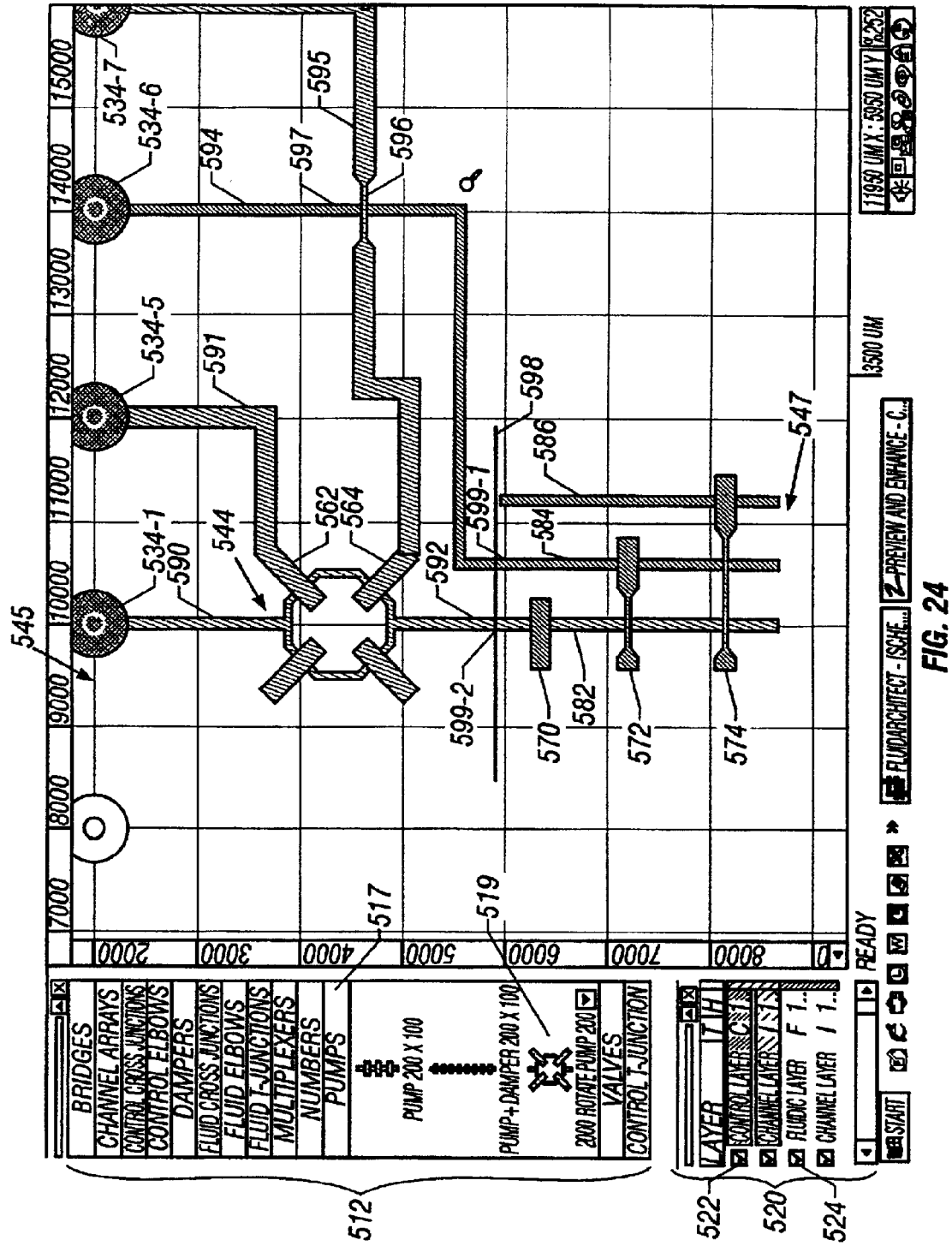
FIG. 24 shows a partially connected layout of a microfluidic circuit having a rotary pump and a channel array of an embodiment of the present invention.

FIG. 24 shows a partially connected layout of a microfluidic circuit having a rotary pump 544 and a channel array 547 according to an embodiment of the present invention. In the layer area 520 both the control layer 522 and the fluidic layer 524 have been selected. Hence both control and fluid channels are displayed on expanded template area 545. I/O port 534-1 is connected to the array pump 544 via fluid channel 590. Rotary pump 544 is connected to channel array 547 via the fluid channel 592. Channel array 547 also receives input from I/O port 534-6 via fluid channel 594. Control channels for rotary pump 544 include control channel 591 from I/O port 534-5 and control channel 595 from I/O port 534-7. Control channel 595 is tapered to a narrow channel 596 to bridge fluid channel 594 (interconnect bridge of FIG. 17B). Fluid channel 594 may also be tapered to a narrow fluid channel 597 to further insure that control channel 595 does not shut off fluid channel 594 when control channel 595 is activated.

In one embodiment, if a user tries to draw a control channel 598 as shown in FIG. 24, a design rule check gives an error that valves are formed at the overlap points 599-1 and 599-2. The user is not allowed to add control channel 598 to expanded template area 545. In another embodiment interconnect bridges would automatically be formed at overlap points 599-1 and 599-2.

Figure 25:
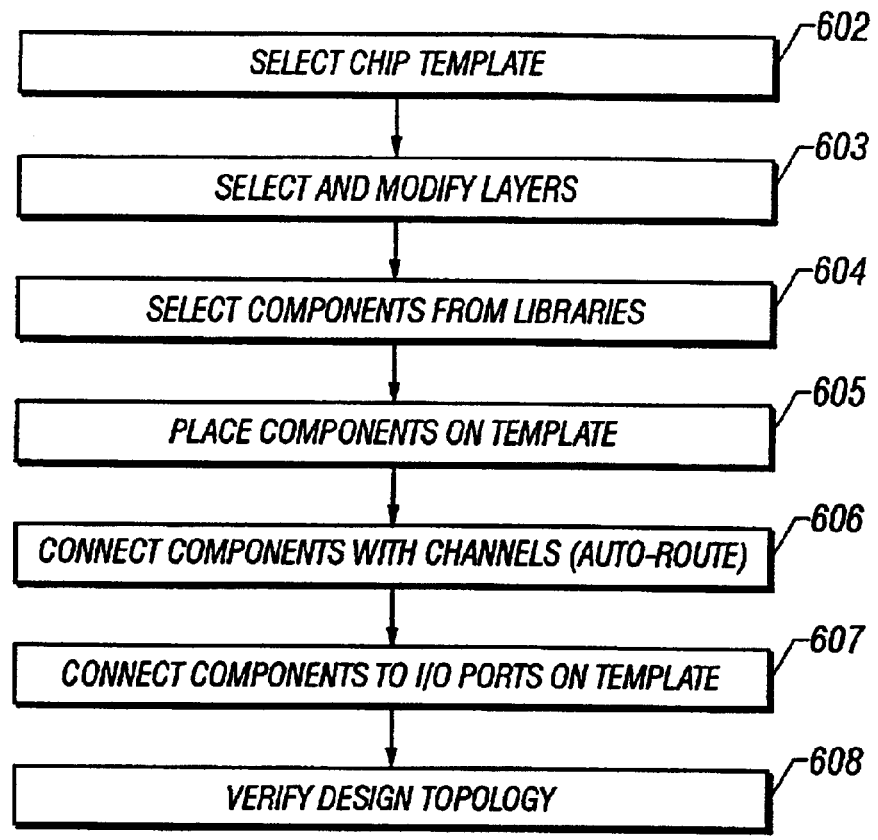
FIG. 25 shows a simplified flowchart having the steps involved in the physical layout of a microfluidic circuit of an embodiment of the present invention.

FIG. 25 shows a flow chart having the steps involved in the physical layout of a microfluidic circuit according to an embodiment of the present invention. At step 602 a chip template is selected from, for example, a plurality of templates such as those shown in FIGS. 16A and 16B. The layers, including the control and fluid layers, are selected and modified (step 603). At step 604 components are selected from the component library area 512 (FIG. 19). At step 605 these components are placed on the template. The placed components are connected (step 606), either manually or via an auto-route routine by channels. For example, the components' control channels are first connected together on the control layer using control channels. Next the components' fluid channels are connected together on the fluid layer using fluid channels. At step 607 some of the components are connected to the I/O ports on the template. At step 608, the design topology of the microfluidic circuit may be manually or automatically verified.

In one embodiment the control channels are not connected to the fluid channels. In another embodiment, although the control channels may be on different layers than the fluid channels, they may be connected to the fluid channels by vias.

Figure 26:
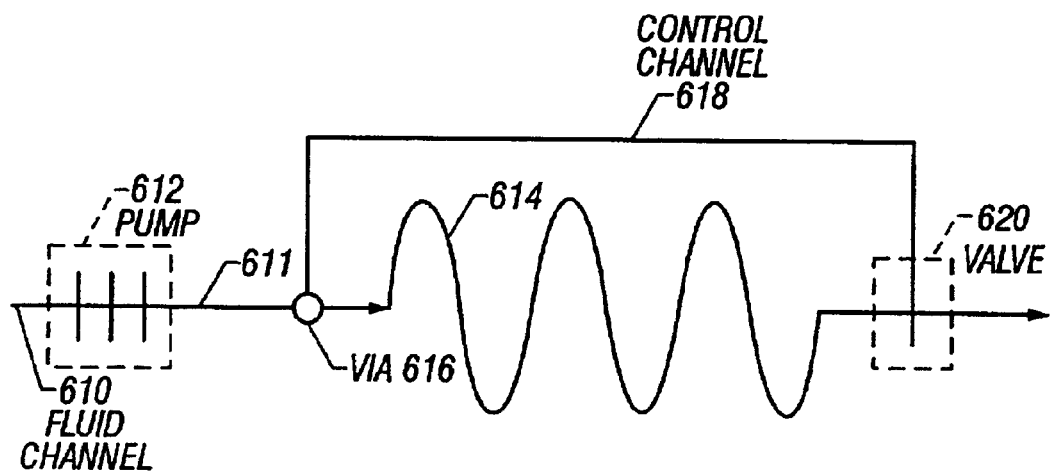
FIG. 26 shows a simplified view of a pressure oscillator structure of one embodiment of the present invention.

FIG. 26 shows a pressure oscillator structure of one embodiment of the present invention. The pressure oscillator operates analogously to oscillator circuits frequently employed in the field of electronics. The pressure oscillator includes a fluid channel 610 which has an initial portion 611 proximate to a pressure source 612, and a serpentine portion 614 distal from pressure source 612. Initial portion 611 is in fluid communication, through via 616, with control channel 618 formed above the level of fluid channel 610. At a location more distal from pressure source 612 than via 616, control channel 618 overlaps, but is separated from, fluid channel 610, thereby forming a valve 620.

The pressure oscillator structure operates as follows. Initially, pressure source 612 provides pressure along fluid channel 611 and control channel 618 through via 616. Because of the serpentine shape of flow channel 614, pressure is lower in region 614 as compared with control channel 618. At valve 620, the pressure difference between serpentine flow channel portion 614 and overlying control channel 618 eventually causes valve 620 to close. Owing to the continued operation of pressure source 612, however, pressure begins to build up in serpentine flow channel portion 614 behind closed valve 620. Eventually the pressure equalizes between control channel 618 and serpentine flow channel portion 614, and valve 620 opens. Given the continuous operation of the pressure source 612, the above-described build up and release of pressure will continue indefinitely, resulting in a regular oscillation of pressure. Such a pressure oscillation device may perform any number of possible functions, including but not limited to, timing.

Figure 27:
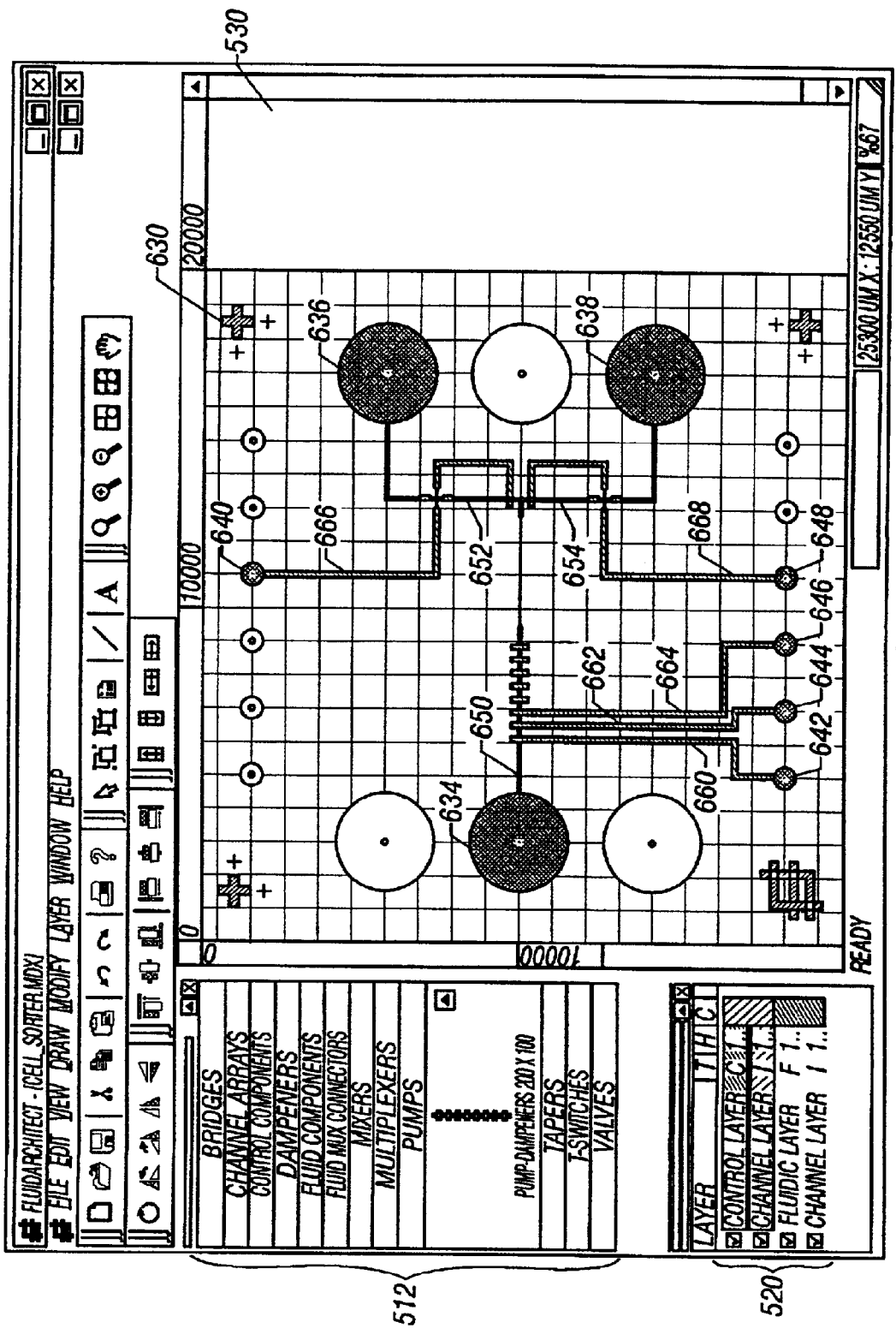
FIG. 27 shows a physical layout of a cell sorter of an embodiment of the present invention.
Figure 28A:
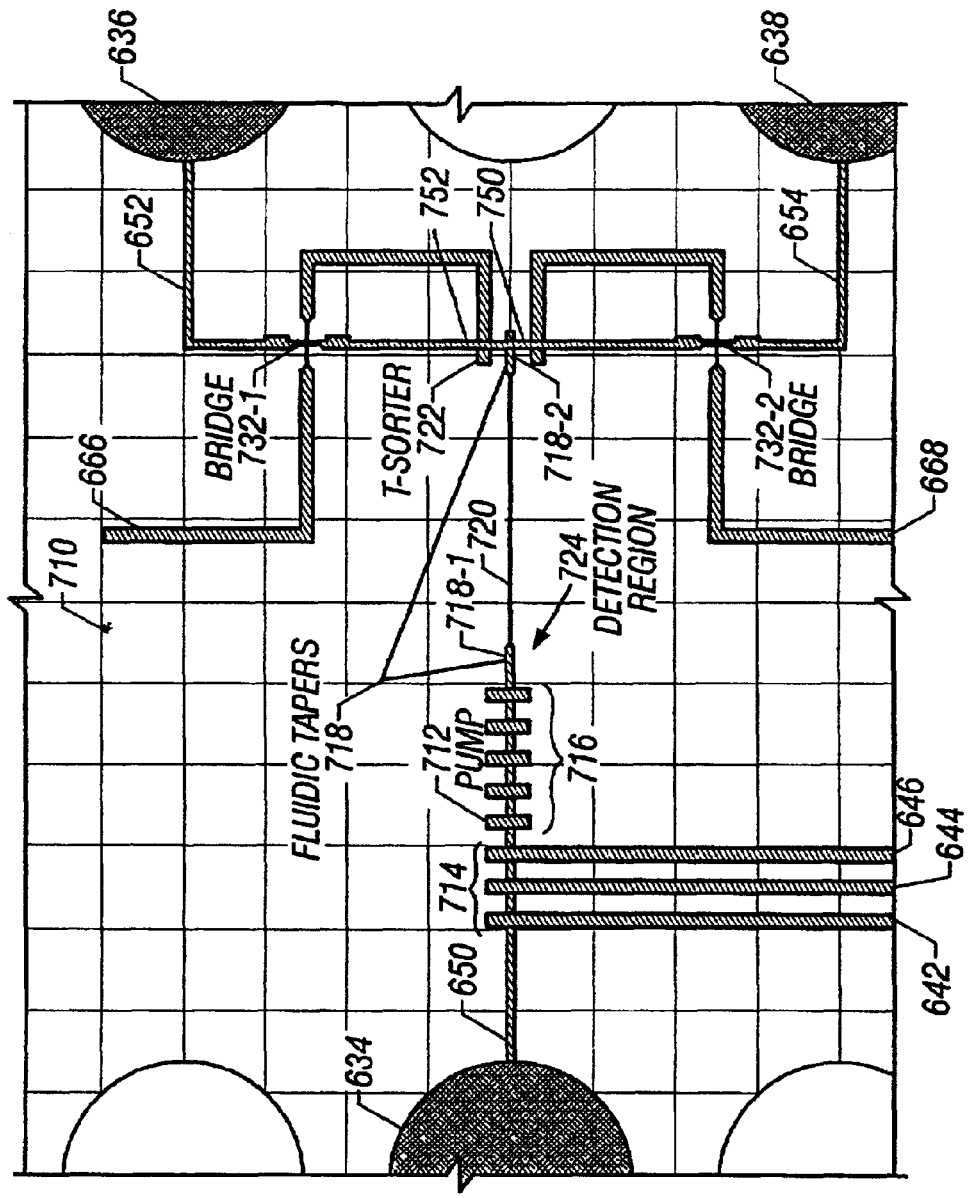
FIG. 28 shows an expanded view of the physical layout of the cell sorter of an embodiment of the present invention.
Figure 28B:
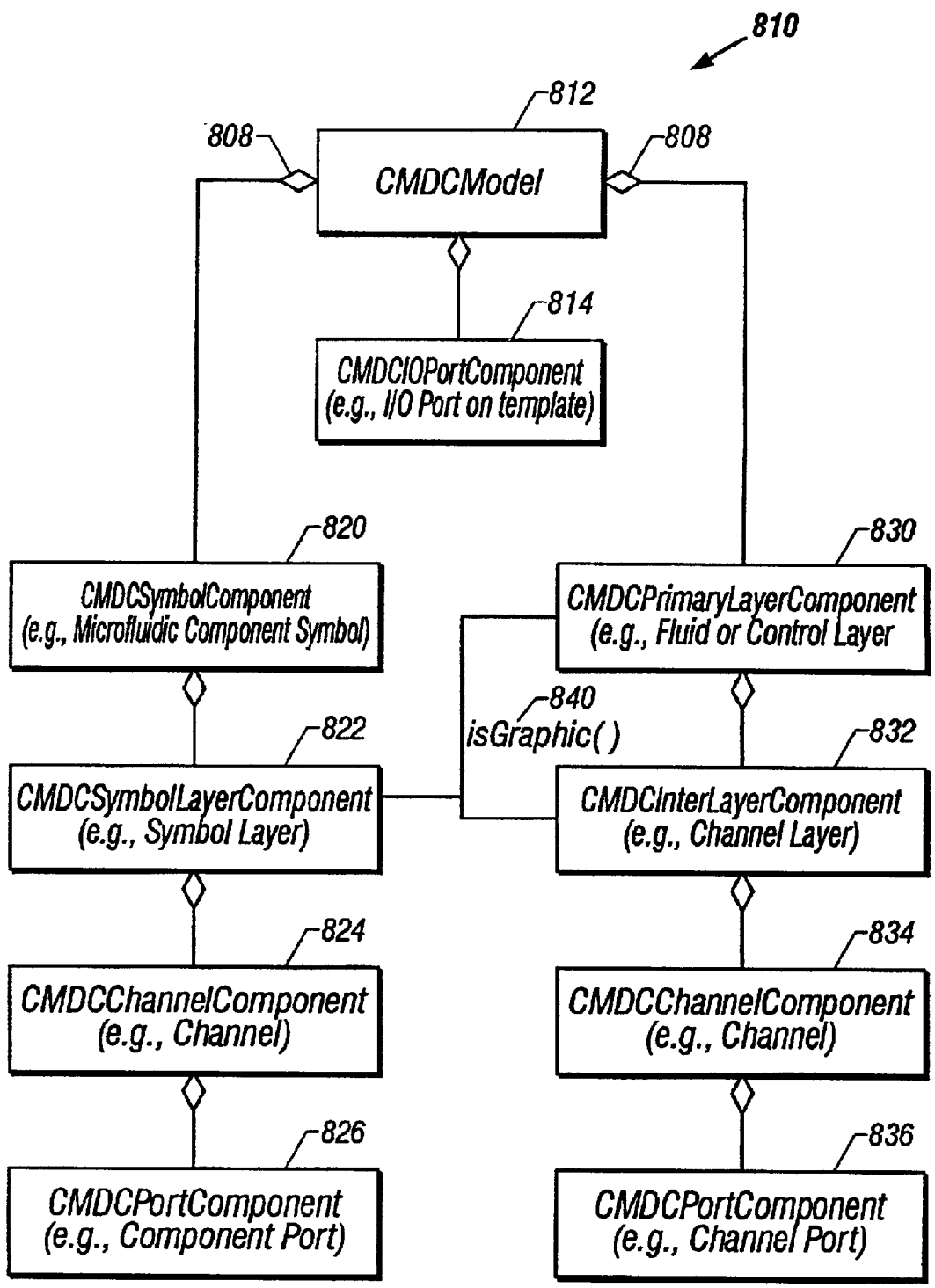

An illustration of an application developed using the physical layout tool of FIG. 19 and the steps of FIG. 25 is a cell sorter shown in FIGS. 27 and 28.

FIG. 27 shows a physical layout of a cell sorter of an embodiment of the present invention. The template 630 is located in active drawing area 530 and has one fluid input port 634, two fluid output ports 636 and 638, and five control input ports 642, 644, 646, 648, and 640. Fluid input port 634 is connected to fluid channel 650. Fluid channel 650 forks to fluid channel 652 and fluid channel 654. Fluid channel 652 is connected to output port 636 and fluid channel 654 is connected to output port 638. Input control port 642 is connected to control channel 660. Input control port 644 is connected to control channel 662. Input control port 646 is connected to control channel 664. Input control port 648 is connected to control channel 668. Input control port 640 is connected to control channel 666.

FIG. 28 shows an expanded view 710 of the physical layout of the cell sorter of an embodiment of the present invention. A pump 712 includes a peristaltic pump 714 and a damper element 716. The pump 712 includes a peristaltic pump 714 which is composed of three individual valves with control channels 642, 644, and 646. The liquid within the fluid channel 650 is pumped by sequentially actuating the individual valves. The damper element 716 is used to provide a smoother flow of pumped fluid. The membrane of the damper element 716 will deflect and absorb the energy caused by the closing of the valves of the peristaltic pump 714. The fluid from fluid input port 634 is pressurized by pump 712 and enters, via a fluidic taper 718-1, a narrow channel 720 which is a detection region 724. The narrow channel 720 is connected to a T-sorter 722 by another fluidic taper 718-2. The fluid in the T-sorter 722 either proceeds to the fluid output port 636 or the fluid output port 638, depending on whether control channel 666 or control channel 668 is activated.

The microfluidic circuit of FIGS. 27 and 28 is laid out according to the steps given in FIG. 25 as follows. First a template 630 is selected (step 602) and placed in drawing area 530. The template has six large I/O ports (e.g., I/O ports 634, 636, and 638 of 3 mm in size) and 12 small I/O ports (e.g., I/O ports 640, 642, 644, 646, and 648 of 625 μm in size). Next at step 603 the layers are selected in layer area 520. From the component library area 512 (FIG. 19), one pump 712, one T-sorter 722, two fluidic tapers 718, and two interconnect bridges 732-1 and 732-2, are dragged and dropped on the template 630 as shown in FIG. 28 (steps 604 and 605). Step 606 has two parts, and involves first connecting the fluid channels of the components by drawing fluid channels on the fluid layer, and second connecting the control channels of the components on the control layer (in this case the connections are only to the template's I/O ports). When the fluid layer is selected, the pump 712 is connected to a first fluid taper 718-1, and via a narrow channel 720 to a second fluid taper 718-2 (see FIG. 28). The narrow fluid channel is created by drawing a normal fluid channel with default width of, for example 100 μm, and then selecting a new channel width of, for example, 30 μm. The second fluid taper 718-2 is connected to the T-sorter 722. At step 607 the T-sorter's fluid channels are connected to I/O ports 636 and 638 on the fluid layer using fluid channels 652 and 654. The control channels of the pump 712 and T-sorter 722 are connected to the I/O ports, 642, 644, 646, 640, and 648, using control channels, 660, 662, 664, 666, and 668, drawn on the control layer. In the case of the T-sorter 722, interconnect bridges 732-1 and 732-2 are used, so that control channels 666 and 668 can bridge the fluid channels 652 and 654 without creating parasitic valves. At step 608 the microfluidic circuit on template 630 is checked for errors. For example a DRC may be done. In an alternative embodiment of the present invention, after the components have been placed on the template 630 (step 605), an auto-routing routine may connect the components with channels (step 606). In another embodiment the design rule checks may be done interactively as each entry in active drawing area 530 is made.

The operation of the sorting device in accordance with one embodiment of the present invention is as follows. The sample is diluted to a level such that only a single sortable entity would be expected to be present in the narrow channel 720 at any time. Assume, for the sake of illustration, that the sortable entity is either size A or size B and that size A entities are collected at fluid output port 636 and size B entities are collected at fluid output port 638. Pump 712 (three control valves and five damping elements) is activated by flowing a fluid through control channels 642, 644, and 646 as described above. The sortable entity enters via input port 634 and moves via fluid channel 650. The sortable entity is pushed by the pump 712 into the narrow channel 722. The narrow channel width is selected such that the sortable entities can move only in a single file manner through this channel. Hence if there happen to be two sortable entities in the narrow channel 722, one must follow the other. The narrow channel 722 serves as a detection region 724, where an external detection system, such as an optical measurement system, is used to determine if the detected sortable entity is size A or size B. The bridge components 732-1 and 732-2 are used to allow crossing of the fluid lines by the control lines without creating a parasitic valve. The bridge components are also used to create an area clear of channels for the detection region 724. If the sortable entity is size A then control channel 668 is activated and control line 666 is deactivated. This turns on the valve 750 and turns off valve 752. Hence the size A entity flows to fluid output port 636. If the sortable entity is size B then control channel 666 is activated and control line 668 is deactivated. This turns on the valve 752 and turns off valve 750. Hence the size B entity flows to fluid output port 638.

Sorting in accordance with the above embodiment would avoid the disadvantages of sorting utilizing conventional electrokinetic flow, such as bubble formation, a strong dependence of flow magnitude and direction on the composition of the solution and surface chemistry effects, a differential mobility of different chemical species, and/or decreased viability of living organisms in the mobile medium. For more detailed discussions of cell sorting by microfabricated devices, see A. Y. Fu et al, "A Microfabricated Fluorescence-Activated Cell Sorter," Nature Biotechnology 17: 1109–1111 (1999); H. P. Chou et al., "A Microfabricated Device for Sizing and Sorting DNA Molecules," Proc. Nat'l Acad. Sci. 96: 11–13 (1999); S. Quake et al., "Disposable Microdevices for DNA Analysis and Cell Sorting," Proc. Solid-State Sensor and Actuator Workshop," Hilton Head, S. C., Jun. 8–11, 1998, pp. 11–14; and H. P. Chou et al., "Microfabricated Devices for Sizing DNA and Sorting Cells, Micro- and Nanofabricated Structures and Devices for Biomedical Environmental Applications," Paul L. Gourley, Editor, Proceedings of SPIE Vol. 3258, 181–7 (1998).

Further details on the physical layout tool is given by the User's Manual in Appendix C, which is herein incorporated by reference.

Physical Analysis (Phase 5)

Once the design has been completed, placed, and routed, a simulation indicating the dynamic performance can be performed under physical analysis 800 (phase 5). As shown in FIG. 1, dynamic simulation models 810 of the components are based on the physical attributes as well as the chosen material properties for the layer in which the component is placed, as provided in the mechanical properties library 820. Fluid characteristics are also taken into account as well as the control signal's actual actuation pressures. The physical analysis 800 in the MCAD system 10 includes one or more of the following: dynamic volumetric flow rates, volumetric capacitances of components, volumetric capacitances of interconnect/routing channels, parasitic layout extraction 830 and/or parasitic components.

In one embodiment the dynamic fluidic flow simulation 840 is performed using ANSYS/Multiphysics (coupled field structural-fluid) and ANSYS/FLOTRAN™ (computational fluid dynamics) tools of ANSYS Inc. of Canonsburg, Pa. (www.ansys.com/products/html/multiphysics.htm and (www.ansys.com/products/flotran.htm). The ANSYS tools can perform laminar flow simulations and coupled physics simulations, such as dynamic fluidic and mechanical simulations, for microfluidic systems. Using this tool, dynamic simulation models 810 are first developed, taking into account the mechanical/structural properties of the model's associated component (mechanical properties library 820). Next using the dynamic simulation models 810 as connected and laid out in the physical layout 410, a dynamic fluidic flow simulation circuit model for the microfluidic circuit of the physical layout 410 is developed. Parasitic or coupling effects between different channels, which are typically second order effects, optionally, may be incorporated into the dynamic fluidic flow simulation circuit model. The ANSYS/Mutiphysics tool is then used to simulate the dynamic fluidic flow simulation circuit model using a variety of test inputs. Both the final outputs and intermediate test points of the circuit model are analyzed to determine if the proper results are achieved. If not, then the physical layout 410 is modified and the associated modified dynamic fluidic flow simulation circuit model is again simulated. This iterative design process is continued until the desired results are achieved.

In another embodiment the dynamic fluidic flow simulation 840 may employ the DCCL 380 used in the functional analysis 360 as shown in FIG. 14.

Device Implementation (Phase 6)

Once the design has been placed and routed, the physical layout 410 of phase 4 will write out the desired chip layout files 902 to manufacture a prototype 904 of the microfluidic circuit as seen in FIG. 1. The DWG/DXF files written from the physical layout 902 can be converted to a manufacturing format, for example, Gerber, HPGL, EPS, DXF, GDS II, or Postscript, for use in device implementation 900. The layout files are then used for mask layout generation of a chip or die. Several masks are then used in step 904 to set up a wafer for manufacturing.

Figure 29:
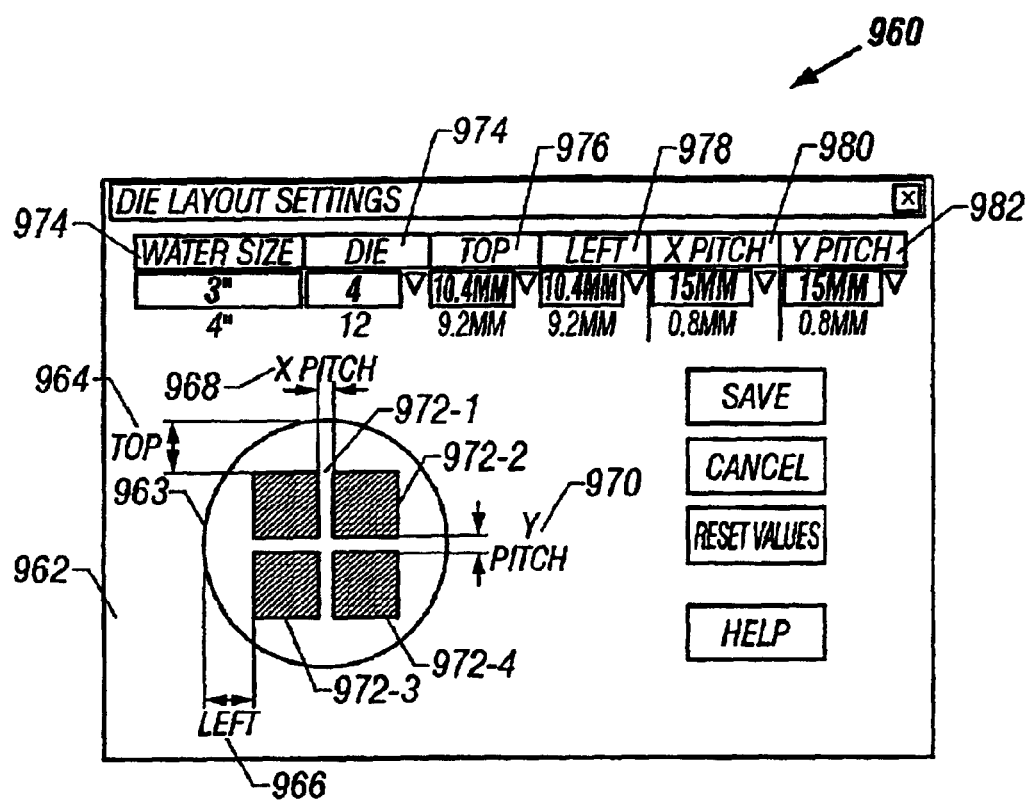
FIG. 29 shows a display for setting up the die layout on a wafer of an embodiment of the present invention.

FIG. 29 shows a display for setting up the die layout on a wafer of an embodiment of the present invention. The die layout settings window 960 has a screen 962 which displays the die layout on a wafer 963. The screen 962 includes, a top displacement 964 from the edge of the wafer 963, a left displacement 966 from the wafer edge, an X pitch 968, a Y pitch 970 and dies, 972-1, 972-2, 972-3, and 972-4. Each die may include a microfluidic circuit such as that shown in FIG. 27. The window 960 also has a table which indicates setting values, including: wafer size 974 (e.g., 3 or 4 inches), number of dies per wafer 974 (e.g., 4 or 12), top displacement 976 (e.g., 10.4 mm or 9.2 mm), left displacement 978 (e.g., 10.4 mm or 9.2 mm), an X pitch 980 (e.g., 15 mm or 0.8 mm), and a Y pitch 982 (e.g., 15 mm or 0.8 mm).

The wafer is then manufactured (step 904) and the resulting microfluidic device is ready for either one-time use (disposable) or for continuous reuse (semi-permanent test device).

The MCAD system 10 can be implemented and executed in a variety of ways. For instance, it can be implemented as a computer-aided design (CAD) program for design, analysis, and implementation of the elastomeric circuits or networks. The CAD program can be provided separately to individual users or distributed over networks such as the Internet so that it can be centrally maintained and controlled.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

What is claimed is:

1. A method, using a computer system, for physically laying out a microfluidic circuit comprising a plurality of microfluidic components, said method comprising:

selecting a template;

placing a first component of said plurality of microfluidic components on said template, wherein said plurality of microfluidic components each have an associated property;

placing a second component of said plurality of microfluidic components on said template; and connecting said first component to said second component wherein said associated property has at least one of physical scaling, physical property, layer assignment, and functional definition and said physical property includes a physical dimension having depth information.

2. The method of claim 1 wherein said physical property includes an element attribute.

3. A method, using a computer system, for physically laying out a microfluidic circuit comprising a plurality of microfluidic components, said method comprising:

selecting a template;

placing a first component of said plurality of microfluidic components on said template, wherein said plurality of microfluidic components each have an associated property;

placing a second component of said plurality of microfluidic components on said template; and connecting said first component to said second component wherein said associated property has at least one of physical scaling, physical property, layer assignment and functional definition, wherein said first component comprises an elastomeric structure.

4. The method of claim 3 wherein said elastomeric structure is formed by bonding together a plurality of layers of elastomer.

5. The method of claim 3 wherein said elastomeric structure is formed in part by depositing a photoresist layer on top of an elastomeric layer.

6. The method of claim 3 wherein each component of said plurality of components includes a representative symbol.

7. The method of claim 3 wherein said first component comprises a control channel which moves an associated rigid silicon material, and a fluid channel formed from an elastomeric material.

8. The method of claim 3 wherein said first component functions as a NAND gate.

9. The method of claim 3 wherein said plurality of microfluidic components include channels, pumps, valves, chambers, cell sorters, DNA fingerprint macros, multiplexers, bridges, pressure oscillators, and layer interconnects.

10. The method of claim 3 wherein said plurality of microfluidic components comprise a structure made from a material selected from the group consisting of a flexible material, a rigid material, or a mixture of rigid and flexible materials.

11. The method of claim 3 wherein said rigid material is a silicon based material.

12. The method of claim 3 wherein said flexible material is an elastomer based material.

13. The method of claim 3 wherein said first component comprises a first control channel and a first fluid channel, said second component comprises a second control channel and a second fluid channel, and said connecting comprises connecting said first fluid channel to said second fluid channel.

14. The method of claim 13 wherein when said first component is on a first fluid layer and said second component is on a second fluid layer, said first fluid channel being connected to said second fluid channel by a via.

15. The method of claim 13 wherein said first control channel is on a control layer and said first fluid channel is on a fluid layer.

16. The method of claim 15 wherein said control layer is separate from said fluid layer.

17. The method of claim 13 wherein said first fluid channel is connected to said second fluid channel by a third fluid channel and wherein when said first control channel is connected to a third control channel that crosses said third fluid channel, said third control channel uses an interconnect bridge to cross said third fluid channel.

18. The method of claim 17 wherein said third fluid channel is reduced in width at and near where said third control channel crosses said third fluid channel.

19. The method of claim 3 wherein said first component comprises a first control channel and a first fluid channel, said second component comprises a second control channel and a second fluid channel, and said connecting comprises connecting said first control channel to said second control channel.

20. The method of claim 3 wherein said connecting comprises auto-routing.

21. The method of claim 3 wherein said connecting comprises routing.

22. The method of claim 3 wherein said connecting comprises a design rule check.

23. A microfluidic circuit physical layout method, using a computer, comprising:
selecting a template comprising an I/O port;
placing a microfluidic component on said template, wherein said microfluidic component comprises a component control channel and a component fluid channel; and
connecting said component control channel to said I/O port.

24. The method of claim 23 wherein said microfluidic component includes an elastomeric structure.

25. The method of claim 23 wherein said connecting includes using a control channel to connect said component control channel to said I/O port.

26. The method of claim 23 further comprising:
placing another microfluidic component on said template; and
connecting said component fluid channel of said microfluidic component to another component fluid channel of said another microfluidic component.

27. A method for physical layout of a microfluidic system, said microfluidic system comprising a plurality of microfluidic components, said method comprising:
placing a component of said plurality of microfluidic components on a first layer of a plurality of layers, said component comprising a first fluid channel and a first control channel;
placing a second fluid channel on a second layer of said plurality of layers; and
connecting said first fluid channel to said second fluid channel using a via.

28. A method for physical layout of a microfluidic system using a computer aided design tool, said microfluidic system comprising a plurality of microfluidic components, said method comprising:
selecting a template, comprising a plurality of layers;
placing a first symbol representing a first component of said plurality of microfluidic components, said first symbol comprising a first fluid channel symbol and a first control channel symbol, said first control channel symbol on a different layer of said plurality of layers than said first fluid channel symbol;
placing a second symbol representing a second component of said plurality of microfluidic components, said second symbol comprising a second fluid channel symbol; and
connecting said first fluid channel symbol to said second fluid channel symbol.

29. The method of claim 28 wherein said template comprises an I/O port and said first symbol comprises a first control channel symbol, said method further comprising connecting said first control channel symbol to said I/O port.

30. The method of claim 28 wherein said plurality of microfluidic components are selected from the group consisting of logic gates, channels, pumps, valves, oscillators, chambers, and layer interconnects.

31. The method of claim 28 wherein symbols are connected according to preset design rules.

32. The method of claim 28 wherein said plurality of microfluidic components are assigned physical scaling.

33. The method of claim 28 wherein said plurality of microfluidic components are assigned physical properties.

34. The method of claim 28 wherein said first component is an active fluidic component.

35. The method of claim 28 wherein symbols of components of said plurality of microfluidic components are placed automatically based on preset design rule constraints.

36. The method of claim 28 wherein symbols of components of said plurality of microfluidic components are placed interactively.

37. The method of claim 28 wherein symbols of components of said plurality of microfluidic components are placed manually subject to predetermined design rule checks.

38. The method of claim 28 wherein said predetermined design rule checks include one or more of the checks on I/O placement, channel size mismatch, dangling channels, overlapping components and channels, and channel spacing.

39. The method of claim 28 wherein the components are placed based on mechanical properties.

40. The method of claim 28 wherein said first symbol is connected to said second symbol automatically using an auto-routing routine.

41. The method of claim 28 wherein said first symbol is routed to said second symbol interactively.

42. The method of claim 28 wherein said first symbol is connected to said second symbol manually using a computer display.

43. A computer program product stored in a computer readable medium for physically laying-out a microfluidic circuit comprising a plurality of microfluidic components, said computer program product comprising:

code for selecting a template; code for placing a first component of said plurality of microfluidic components on said template, wherein said plurality of microfluidic components comprise multilayered components;

code for placing a second component of said plurality of microfluidic components on said template; and code for connecting said first component to said second component wherein the microfluidic component of said microfluidic components comprises a data structure having channel depth information.

* * * * *